(12) United States Patent
Hurley et al.

(10) Patent No.: US 11,943,546 B2
(45) Date of Patent: Mar. 26, 2024

(54) WHITE BALANCE WITH REFERENCE ILLUMINANTS

(71) Applicant: RINGO AI, INC., Santa Cruz, CA (US)

(72) Inventors: Jay Hurley, Aptos, CA (US); Matthew D. Weaver, Aptos, CA (US); Jeffrey Saake, San Francisco, CA (US)

(73) Assignee: RINGO AI, INC., Santa Cruz, CA (US)

( * ) Notice: Subject to any disclaimer, the term of this patent is extended or adjusted under 35 U.S.C. 154(b) by 29 days.

(21) Appl. No.: 17/473,538

(22) Filed: Sep. 13, 2021

(65) Prior Publication Data

US 2021/0409667 A1    Dec. 30, 2021

Related U.S. Application Data

(63) Continuation of application No. PCT/US2020/022639, filed on Mar. 13, 2020.

(Continued)

(51) Int. Cl.
*H04N 23/88*    (2023.01)
*H04N 23/10*    (2023.01)
(Continued)

(52) U.S. Cl.
CPC ........... *H04N 23/88* (2023.01); *H04N 23/125* (2023.01); *H04N 23/56* (2023.01); *H04N 23/60* (2023.01)

(58) Field of Classification Search
CPC ...... H04N 23/88; H04N 23/125; H04N 23/56; H04N 23/60; H04N 1/6086; H04N 1/6077;
(Continued)

(56) References Cited

U.S. PATENT DOCUMENTS 5,963,333 A † 10/1999 Walowit
8,749,647 B2 * 6/2014 Harikae ............. H04N 1/00307
348/333.12
(Continued)

FOREIGN PATENT DOCUMENTS

CA    WO2004079314 A1 †  9/2004
DE    102016226206.8 A1    6/2018
(Continued)

OTHER PUBLICATIONS

International Search Report and Written Opinion dated Jun. 15, 2020 for International Application No. PCT/US2020/022639, 12 pages.
(Continued)

*Primary Examiner* — Abdelaaziz Tissire
(74) *Attorney, Agent, or Firm* — Perkins Coie LLP; Andrew T. Pettit

(57) ABSTRACT

Introduced here are computer programs and associated computer-implemented techniques for achieving high-fidelity color reproduction in the absence of any known reflectance spectrums. That is, high-fidelity color reproduction can be achieved without portable references, such as gray cards and color checkers. To accomplish this, a new reference spectrum—the "reference illuminant spectrum"—is introduced into scenes to be imaged by image sensors. The reference illuminant spectrum is created by a multi-channel light source whose spectral properties are known.

12 Claims, 20 Drawing Sheets
(9 of 20 Drawing Sheet(s) Filed in Color)

Related U.S. Application Data

(60) Provisional application No. 62/818,055, filed on Mar. 13, 2019.

(51) Int. Cl.
*H04N 23/56* (2023.01)
*H04N 23/60* (2023.01)

(58) Field of Classification Search
CPC ........ H04N 23/73; H04N 23/74; G03B 15/05; G03B 2215/0503; G03B 2215/0567; G03B 2215/0571; G06T 2207/10024; G06T 7/90

See application file for complete search history.

(56) References Cited

U.S. PATENT DOCUMENTS

| | | | |
|---|---|---|---|
| 9,671,329 | B2 | 6/2017 | Hennebelle |
| 10,429,298 | B2 | 10/2019 | Vauclin et al. |
| 10,951,831 | B2 | 3/2021 | Seiffert et al. |
| 2006/0093211 | A1* | 5/2006 | Matsuura ............. H04N 1/6058 382/162 |
| 2009/0046928 | A1* | 2/2009 | Kwak .................... H04N 1/608 382/167 |
| 2010/0066857 | A1* | 3/2010 | Ovsiannikov .......... H04N 23/88 348/E9.051 |
| 2011/0187891 | A1* | 8/2011 | Zhang .................. H04N 1/6077 348/E9.051 |
| 2015/0124072 | A1 | 5/2015 | Wei et al. |
| 2015/0259837 | A1* | 9/2015 | Tokura ................... D05B 21/00 112/102.5 |
| 2019/0012511 | A1 | 1/2019 | Weaver et al. |

FOREIGN PATENT DOCUMENTS

| | | |
|---|---|---|
| EP | 2107814 A1 | 10/2009 |
| EP | 2815218 A1 | 12/2014 |
| EP | 3356800 B1 | 8/2018 |
| EP | 3560185 B1 | 10/2019 |
| FR | 1257403 A1 | 7/2012 |
| FR | 1251484 A1 | 8/2013 |
| FR | 1254559 A1 | 8/2013 |
| FR | 1559287 A1 | 3/2017 |
| FR | 1559309 A1 | 3/2017 |
| GB | 2474701 † | 4/2011 |
| WO | 2013120956 A1 | 8/2013 |
| WO | 2015065570 A1 | 5/2015 |
| WO | 2017055580 A1 | 4/2017 |
| WO | 2017137925 A1 | 8/2017 |
| WO | 2018115346 A1 | 6/2018 |

OTHER PUBLICATIONS

Hsu, Eugene, et al., "ACM Transactions on Graphics, Light Mixture Estimation for Spatially Varying White Balance", vol. 27, No. 3, Article 70, Aug. 2008, pp. 70:1-70:7.

Martinez-Garcia, Juan, et al., "Color Calibration of An RGB Digital Camera for the Microscopic Observation of Highly Specular Materials", Universite de Lyon, Universite Jean Monnet de Saint-Etienne, CNRS UMR 5516 Laboratoire Hubert Curien, F-42000 Saint-Etienne, France, Mar. 13, 2015, 11 pages.

Iqbal, Zafar et al., "Spectral Fingerprinting on a Standard Mobile Phone", Division of Applied Physics, IFM- Linköping University, Journal of Sensors, vol. 2010, Article ID 381796, Apr. 20, 2010, 9 pages, doi:10.1155/2010/381796.

Ohta et al., "Recovery of Illuminant and Surface Colors from Images Based on the CIE Daylight," Lecture Notes in Computer Science, vol. 801, Jan-Olof Eklundh (Ed.), Computer Vision—ECOV '94, Springer, 1994.†

Park et al., Estimation of spectral reflectance curves from multispectral image data, Appl Opt. Dec. 1, 1977;16(12):3107-14. doi: 10.1364/AO.16.003107. PMID: 20174311.†

Tsukada et al., "An approach to color constancy using multiple images," [1990] Proceedings Third International Conference on Computer Vision, 1990, pp. 385-389, doi: 10.1109/ICCV.1990.139557.†

Ho et al., "Separating a color signal into illumination and surface reflectance components: theory and applications," in IEEE Transactions on Pattern Analysis and Machine Intelligence, vol. 12, No. 10, pp. 966-977, Oct. 1990, doi: 10.1109/34.58869.†

\* cited by examiner
† cited by third party

700

701
Create a series of altered images by subtracting the red, green, and blue values of each pixel in the second image from the red, green, and blue values of the corresponding pixel in each of the series of differentially illuminated images 702
Convert the series of altered images into a CIELAB color space so that each pixel is represented by a series of a* values and a series of b* values 703
Convert the first image into the CIELAB color space so that each pixel is represented as a reference a* value and a reference b* value 704
Generate, for each pixel, a first linear equation based on the corresponding reference a* value and the corresponding series of a* values 705
Generate, for each pixel, a second linear equation based on the corresponding reference b* value and the corresponding series of b* values 706
Perform, for each pixel, a least squares optimization on the first and second linear equations to produce a vector of coefficients 707
Populate a data structure representative of the calibration matrix with the vectors of coefficients

FIGURE 7

Control String: [150, 100, 100, 100, 100]
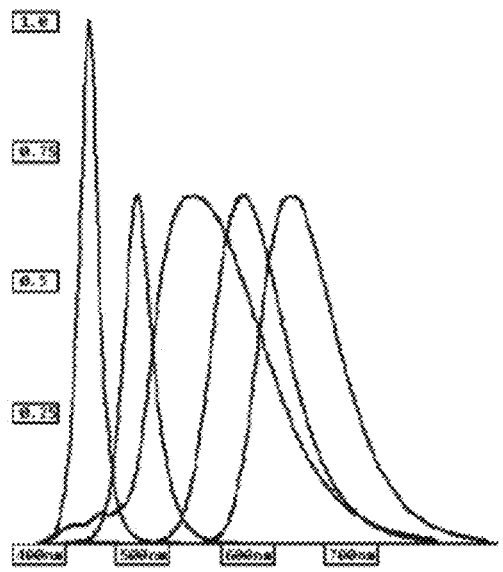 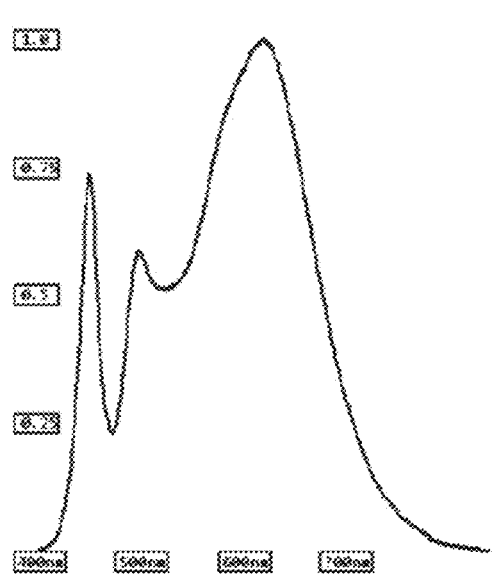
Individual Channel Spectra      Composite Illuminant Spectrum
Control String: [100, 150, 100, 100, 100]
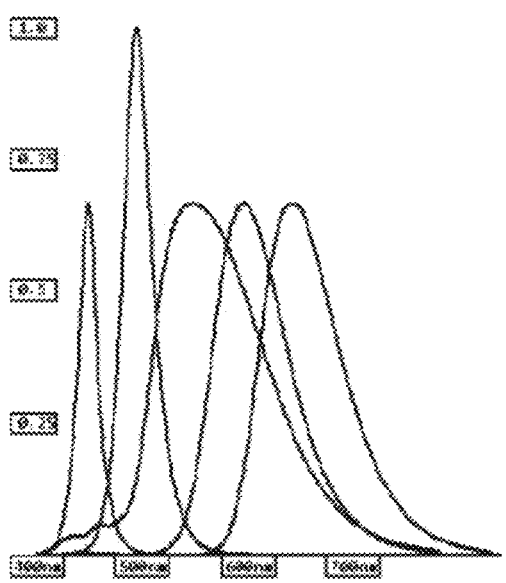 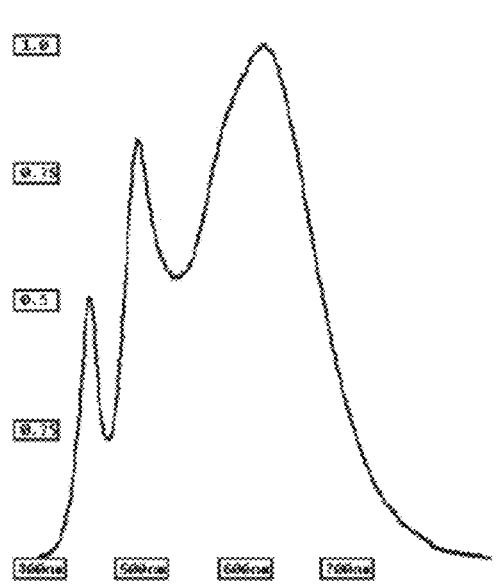
Individual Channel Spectra      Composite Illuminant Spectrum
FIGURE 9

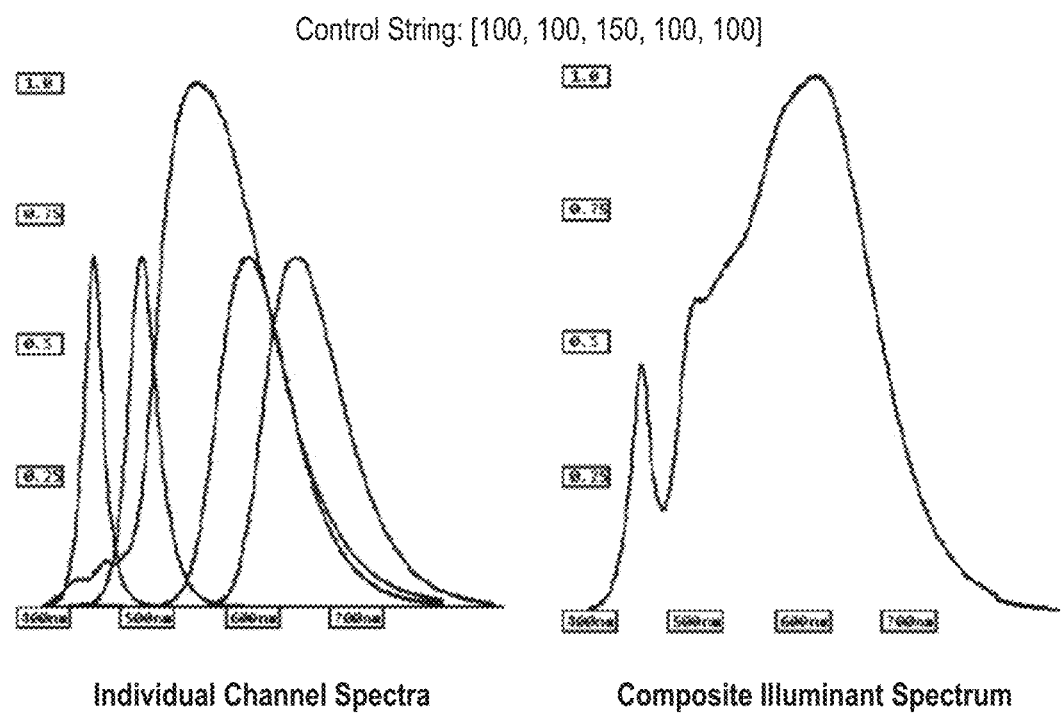
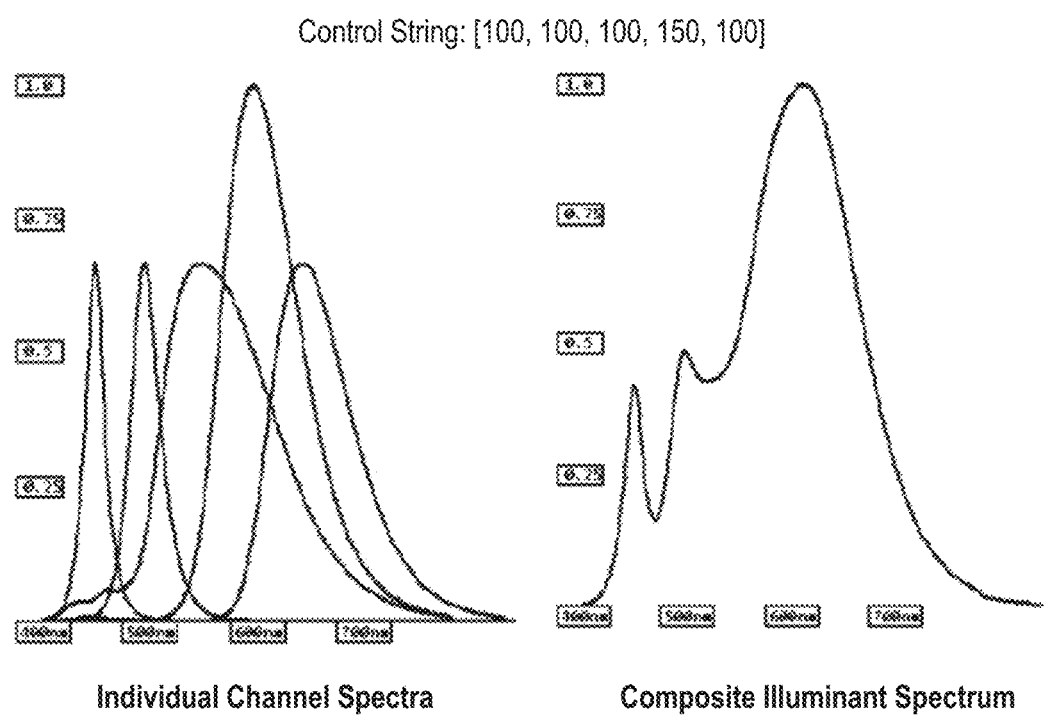
FIGURE 9, CONT.

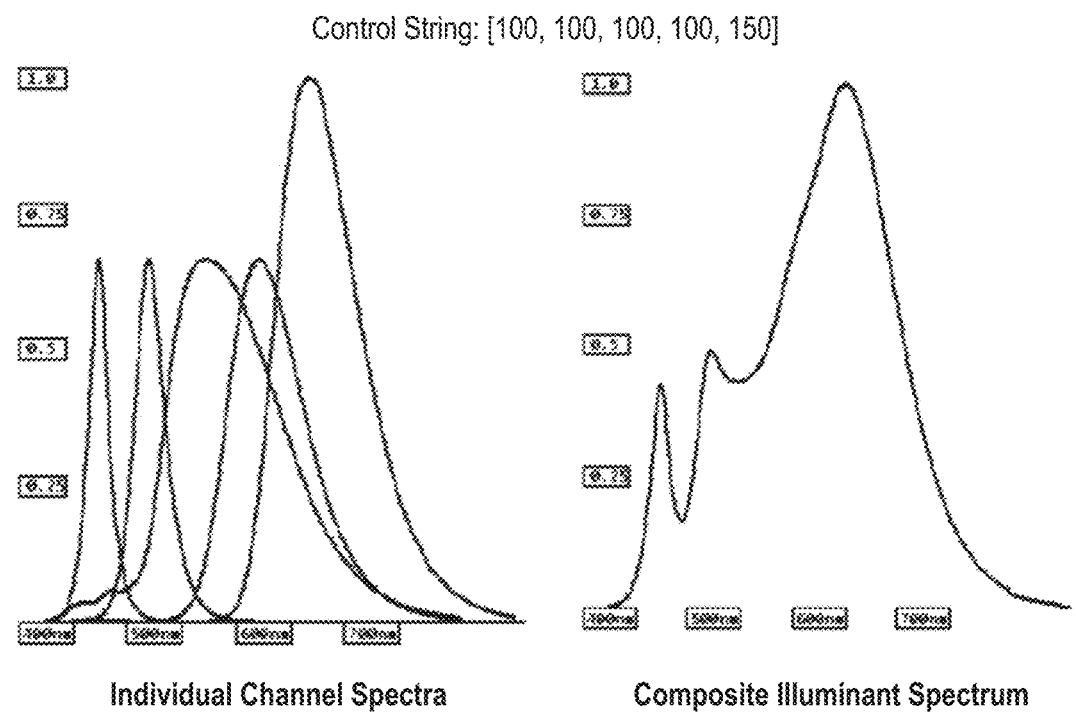
FIGURE 9, CONT.

WHITE BALANCE WITH REFERENCE ILLUMINANTS

CROSS-REFERENCE TO RELATED APPLICATIONS

This application is a continuation of International Application No. PCT/US20/22639, titled "White Balance with Reference Illuminants" and filed Mar. 13, 2020, which claims priority to U.S. Provisional Application No. 62/818,055, titled "High Fidelity Color Technologies" and filed on Mar. 13, 2019, each of which is incorporated by reference herein in its entirety.

TECHNICAL FIELD

Various embodiments concern computer programs and associated computer-implemented techniques for achieving high-fidelity color reproduction by correcting the color values of pixels in a digital image.

BACKGROUND

Illuminants can be characterized by color temperature as measured in degrees Kelvin (K). The color temperature of an illuminant is the temperature at which the color of light emitted from a heated blackbody is matched by the color of the illuminant. For illuminants that do not substantially emulate blackbodies, such as fluorescent bulbs and light-emitting diodes (LEDs), the temperature at which the color of light emitted from a heated blackbody approximates the color of the illuminant is called the correlated color temperature (CCT).

Ideally, the scene in a digital image will be lit by one or more illuminants with the same color temperature. However, this rarely happens. Instead, scenes are normally lit by multiple illuminants with different color temperatures—a scenario referred to as "mixed lighting." For instance, an indoor scene could be lit by overhead lighting elements, indirect sunlight coming through a window, etc. Such a scenario may also occur due to different lighting conditions that have different color temperatures. For instance, while a pair of digital images of an outdoor scene may be created only moments apart, the color temperature will be different if the sun becomes more obscured in the meantime.

White balancing is the process by which a digital image is balanced in an attempt to bring the color temperature back to neural. At a high level, white balance removes unrealistic color casts to emulate what the human eye does when viewing white objects. This is done so that objects in digital images that appear white to the human eye are rendered white in those digital images.

BRIEF DESCRIPTION OF THE DRAWINGS

This patent or application contains at least one drawing executed in color. Copies of this patent or application publication with color drawings will be provided by the Office upon request and payment of the necessary fee.

FIG. 7 depicts a flow diagram of a process for computing a calibration matrix based on a first image captured with an automatic white balance (AWB) setting, a second image captured with a fixed white balance (FWB) setting, and a series of differentially illuminated images captured with the FWB setting.

FIG. 9 illustrates how a multi-channel light source may perform a series of illumination events to differentially illuminate a scene.

Figure 1A:
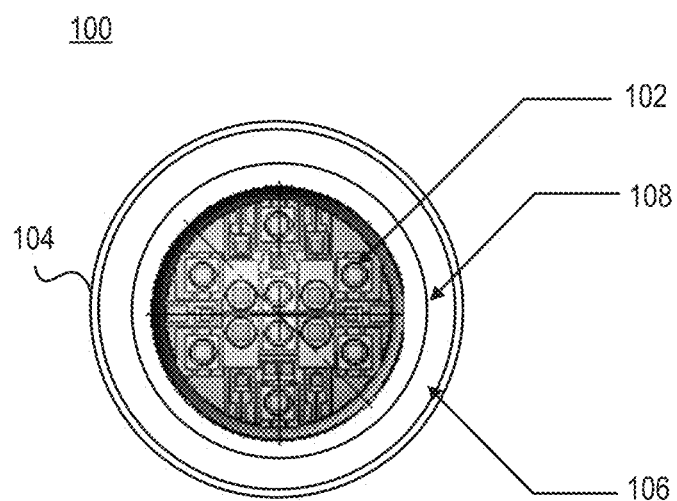
FIG. 1A depicts a top view of a multi-channel light source that includes multiple color channels that are configured to produce different colors.

Various features of the technologies described herein will become more apparent to those skilled in the art from a study of the Detailed Description in conjunction with the drawings. Embodiments are illustrated by way of example and not limitation in the drawings, in which like references may indicate similar elements. While the drawings depict various embodiments for the purpose of illustration, those skilled in the art will recognize that alternative embodiments may be employed without departing from the principles of the technologies. Accordingly, while specific embodiments are shown in the drawings, the technologies are amenable to various modifications.

DETAILED DESCRIPTION

Not only is manually correcting the white balance during post-processing a time consuming process, but the results tend to be inconsistent—even when performed by professionals. Some professionals tend to favor warmer digital images, while other professionals tend to favor cooler digital images. To address these issues, modern digital cameras have been designed to automatically perform white balancing. For instance, a digital camera may have an automatic white balance (AWB) setting that, when selected, causes the scene to be assessed by algorithms designed to identify the brightest part as the white point and then attempt to balance the color of digital images based on that reference.

In color-critical situations, a neutral reference may be introduced to the scene to ensure that the AWB algorithms do not encounter problems. For example, professional photographers/videographers may carry portable references that can be easily added to scenes. One example of a portable reference is a flat surface of a neutral gray color that derives from a flat reflectance spectrum. Another example of a portable reference is a flat surface with a series of different colors corresponding to different reflectance spectrums. The former is normally referred to as a "gray card," while the latter is normally referred to as a "color checker." Regardless of its form, a portable reference will introduce a known reflectance spectrum into a scene that can be used by the algorithms as a reference for automatic white balancing.

When a scene does not include a known reflectance spectrum, the AWB algorithms can (and often do) produce digital images that are visibly incorrect in terms of color. For example, if the scene is predominantly red, the AWB algorithms may mistake this for a color cast induced by a warm illuminant and then try to compensate by making the average color closer to neural. But this introduces a bluish color cast that may be quite noticeable. FIGS. 10-16 include some examples of images in which the AWB algorithms failed to properly scale the color values.

Introduced here, therefore, are computer programs and associated computer-implemented techniques for achieving high-fidelity color reproduction without portable references. To accomplish this, a new reference spectrum—the "reference illuminant spectrum"—is introduced into scenes to be imaged by image sensors. The reference illuminant spectrum is created by an illuminant whose spectral properties are known.

As further discussed below, a single reference illuminant may be inadequate to properly render the colors in a scene. This is because, for any single illuminant spectrum, there are instances of color metamerism where pixels corresponding to objects with different reflectance properties have the same color values as measured by the image sensor. That is, these pixels will appear the same to the image sensor despite not actually being the same color. Accordingly, multiple reference illuminant spectrums may be differentially introduced to mitigate the impact of color metamerism.

Embodiments may be described with reference to particular electronic devices, light sources, or image sensors. For example, the technology may be described in the context of mobile phones that include multi-channel light source with LEDs of several different colors and a multi-channel image sensor having red, green, and blue channels. However, those skilled in the art will recognize that these features are equally applicable to other types of electronic devices, light sources, and image sensors. For instance, the same features may be applied by multi-channel light sources configured to produce non-visible light (e.g., ultraviolet light and/or infrared light) instead of, or in addition to, visible light. Accordingly, while embodiments may be described in the context of light sources with multiple "color channels," the features may be equally applicable to non-color channels (i.e., channels having one or more illuminants that produce non-visible light).

Embodiments may also be described with reference to "flash events." Generally, flash events are performed by an electronic device to flood a scene with visible light for a short interval of time while a digital image of the scene is captured. However, the features described herein are similarly applicable to other illumination events. For example, an electronic device could strobe through the color channels of a multi-channel light source, determine an effect of each color channel, and then simultaneously drive at least some of the color channels to produce visible light that floods the scene for an extended duration. Accordingly, while embodiments may be described in the context of capturing and then processing digital images, those skilled in the art will recognize that the features are equally applicable to capturing and then processing a series of digital images that represent the frames of a video.

The technology can be embodied using special-purpose hardware (e.g., circuitry), programmable circuitry appropriately programmed with software and/or firmware, or a combination of special-purpose hardware and programmable circuitry. Accordingly, embodiments may include a machine-readable medium having instructions that, when executed, cause an electronic device to introduce a series of illuminant spectrums into a scene, capture a series of images in conjunction with the series of illuminant spectrums, and then establish spectral information on a per-pixel basis based on an analysis of the series of images.

Terminology

References in this description to "an embodiment" or "one embodiment" means that the feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to"). The terms "connected," "coupled," or any variant thereof is intended to include any connection or coupling between two or more elements, either direct or indirect. The connection/coupling can be physical, logical, or a combination thereof. For example, components may be electrically or communicatively coupled to one another despite not sharing a physical connection.

The term "based on" is also to be construed in an inclusive sense rather than an exclusive or exhaustive sense. Thus, unless otherwise noted, the term "based on" is intended to mean "based at least in part on."

The term "module" refers broadly to software components, firmware components, and/or hardware components. Modules are typically functional components that can generate useful data or other output(s) based on specified input(s). A module may be self-contained. A computer program may include one or more modules. For instance, a computer program may include multiple modules responsible for completing different tasks or a single module responsible for completing all tasks.

When used in reference to a list of multiple items, the word "or" is intended to cover all of the following interpretations: any of the items in the list, all of the items in the list, and any combination of items in the list.

The sequences of steps performed in any of the processes described herein are exemplary. However, unless contrary to physical possibility, the steps may be performed in various sequences and combinations. For example, steps could be added to, or removed from, the processes described herein. Similarly, steps could be replaced or reordered. Thus, descriptions of any processes are intended to be open-ended.

Overview of Light Source

FIG. 1A depicts a top view of a multi-channel light source 100 that includes multiple color channels able to produce different colors. Each color channel can include one or more illuminants 102 designed to produce light of a substantially similar color. For example, the multi-channel light source 100 may include a single illuminant configured to produce a first color, multiple illuminants configured to produce a second color, etc. Note that, for the purpose of simplification, a color channel may be said to have "an illuminant" regardless of how many separate illuminants the color channel includes.

One example of an illuminant is an LED. An LED is a two-lead illuminant that is generally comprised of an inorganic semiconductor material. While embodiments may be described in the context of LEDs, the technology is equally applicable to other types of illuminant. Table I includes several examples of available colors of LEDs, as well as the corresponding wavelength range and representative materials.

TABLE I

Range (in nanometers) in which the dominant wavelength resides and representative materials for available colors of LEDs.

| Color | Dominant Wavelength | Representative Materials |
|---|---|---|
| Infrared | $\lambda > 760$ | Gallium arsenide; and Aluminum gallium arsenide |
| Red | $610 < \lambda < 760$ | Aluminum gallium arsenide; Gallium arsenide phosphide; Aluminum gallium indium phosphide; and Gallium(III) phosphide |
| Orange | $590 < \lambda < 610$ | Gallium arsenide phosphide; Aluminum gallium indium phosphide; and Gallium(III) phosphide |
| Yellow | $570 < \lambda < 590$ | Gallium arsenide phosphide; Aluminum gallium indium phosphide; and Gallium(III) phosphide |
| Green | $500 < \lambda < 570$ | Aluminum gallium phosphide; Aluminum gallium indium phosphide; Gallium(III) phosphide; Indium gallium nitride; and Gallium(III) nitride |
| Blue | $450 < \lambda < 500$ | Zinc selenide; and Indium gallium nitride |
| Violet | $400 < \lambda < 450$ | Indium gallium nitride |
| Ultraviolet | $\lambda < 400$ | Indium gallium nitride; Diamond; Boron nitride; Aluminum nitride; Aluminum gallium nitride; and Aluminum gallium indium nitride |

Other colors not shown in Table I may also be incorporated into the light source 100. Examples of such colors include cyan ($490 < \lambda < 515$), lime ($560 < \lambda < 575$), amber ($580 < \lambda < 590$), and indigo ($425 < \lambda < 450$). Those skilled in the art will recognize that these wavelength ranges are simply included for the purpose of illustration.

As noted above, a multi-channel light source 100 may include multiple color channels able to produce different colors. For example, the light source 100 may include three separate color channels configured to produce blue light, green light, and red light. Such light sources may be referred to as "RGB light sources." As another example, the light source 100 may include four separate color channels configured to produce blue light, green light, red light, and either amber light or white light. Such light sources may be referred to as "RGBA light sources" or "RGBW light sources." As another example, the light source 100 may include five separate color channels configured to produce blue light, cyan light, lime light, amber light, and red light. As another example, the light source 100 may include seven separate color channels configured to produce blue light, cyan light, green light, amber light, red light, violet light, and white light. Thus, the light source 100 could include three channels, four channels, five channels, seven channels, etc.

While three- and four-channel light sources improve upon conventional flash technologies, they may have a lumpy spectral distribution or narrow range of high fidelity. Consequently, the multi-channel light source 100 will often include at least five different color channels. As the number of color channels increases, the light quality, CCT range, quality over range, and spectral sampling will also generally increase. For example, a five-channel light source having properly selected illuminants can be designed to deliver full-spectrum white light over a broad CCT range (e.g., from 1650K to over 10000K) at $\Delta uV$ of $\pm 0.002$. Moreover, by employing the five-channel light source, the spectral distribution can be sampled in a substantially continuous (i.e., non-lumpy) manner.

Figure 2:
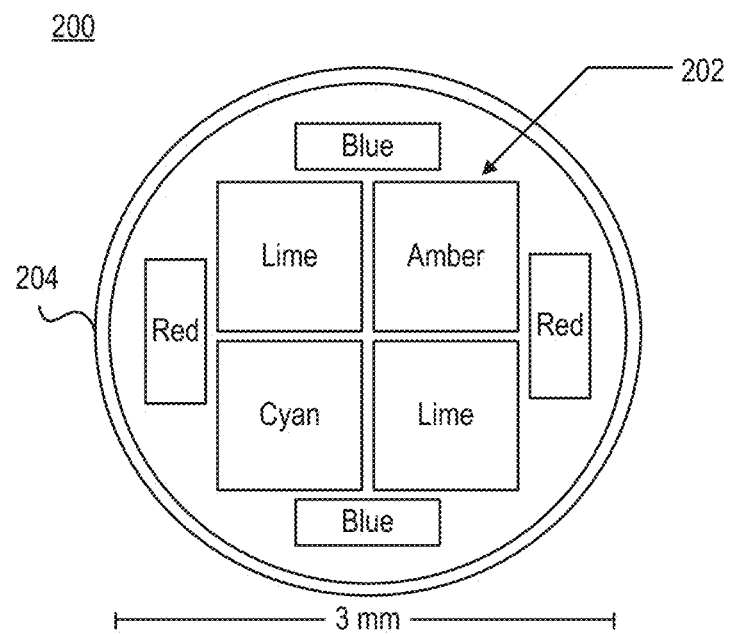
FIG. 2 depicts an example of an array of illuminants.

Due to their low heat production, LEDs can be located close together. Accordingly, if the illuminants 102 of the multi-channel light source are LEDs, then the light source 100 may include an array comprised of multiple dies placed arbitrarily close together. Note, however, that the placement may be limited by "whitewall" space between adjacent dies. The whitewall space is generally on the order of approximately 0.1 millimeters (mm), though it may be limited (e.g., to no more than 0.2 mm) based on the desired diameter of the light source 100 as a whole. In FIG. 2, for example, the array includes eight dies associated with five different color channels Such an array may be sized to fit within similar dimensions as conventional flash technology. The array may also be based on standard production dies requiring, for example, a 2-1-1-0.5-0.5 area ratio of lime-amber-cyan-red-blue. The array may be driven by one or more linear field-effect transistor-based (FET-based) current-regulated drivers 110. In some embodiments, each color channel is driven by a corresponding driver. These drivers 110 may be affixed to, or embedded within, a substrate 104 arranged beneath the illuminants 102.

By independently driving each color channel, the multi-channel light source 100 can produce white light at different CCTs. For example, the multi-channel light source 100 may emit a flash of light that illuminates a scene in conjunction with the capture of an image by an electronic device. Examples of electronic devices include mobile phones, tablet computers, digital cameras (e.g., single-lens reflex (SLR) cameras, digital SLR (DSLR) cameras, and light-field cameras, which may also be referred to as "plenoptic cameras"), etc. Light produced by the multi-channel light source 100 can improve the quality of images taken in the context of consumer photography, prosumer photography, professional photography, etc.

Controlling the multi-channel light source in such a manner enables better precision/accuracy of spectral control across various operating states in comparison to traditional lighting technologies. All traditional lighting technologies are designed to emit light in a desired segment of the electromagnetic spectrum. However, the light (and thus the segment of the electromagnetic spectrum) will vary based on factors such as temperature, age, and brightness. Unlike traditional lighting technologies, the multi-channel light source can be handled such that the output of each channel is known at all times. Using this information, a controller 112 can compensate for the above-mentioned factors by (i) adjusting the current provided to each channel and/or (ii) adjusting the ratios of the channels to compensate for spectral shifts and maintain the desired segment of the electromagnetic spectrum. One example of a controller 112 is a central processing unit (also referred to as a "processor").

In some embodiments, the multi-channel light source 100 is able to produce colored light by separately driving the appropriate color channel(s). For example, a controller 112 may cause the multi-channel light source 100 to produce a colored light by driving a single color channel (e.g., a red color channel to produce red light) or multiple color channels (e.g., a red color channel and an amber color channel to produce orange light). As noted above, the controller 112 may also cause the multi-channel light source 100 to produce white light having a desired CCT by simultaneously driving each color channel. In particular, the controller 112 may determine, based on a color mixing model, operating parameters required to achieve the desired CCT. The operating parameters may specify, for example, the driving current to be provided to each color channel. By varying the operating parameters, the controller can tune the CCT of the white light as necessary.

Although the illuminants 102 are illustrated as an array of LEDs positioned on a substrate 104, other arrangements are also possible. In some cases, a different arrangement may be preferred due to thermal constraints, size constraints, color mixing constraints, etc. For example, the multi-channel light source 100 may include a circular arrangement, grid arrangement, or cluster arrangement of LEDs.

Figure 1B:
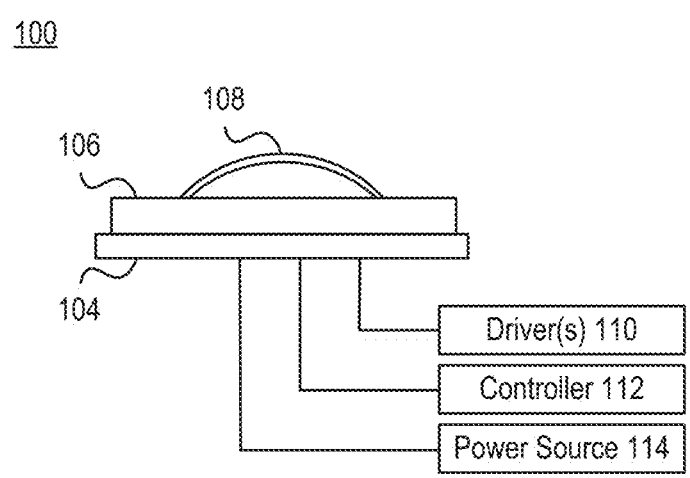
FIG. 1B depicts a side view of the multi-channel light source illustrating how, in some embodiments, the illuminants can reside within a housing.

FIG. 1B depicts a side view of the multi-channel light source 100 illustrating how, in some embodiments, the illuminants 102 reside within a housing. The housing can include a base plate 106 that surrounds the illuminants 102 and/or a protective surface 108 that covers the illuminants 102. While the protective surface 108 shown here is in the form of a dome, those skilled in the art will recognize that other designs are possible. For example, the protective surface 108 may instead be arranged in parallel relation to the substrate 104. Moreover, the protective surface 108 may be designed such that, when the multi-channel light source 100 is secured within an electronic device, the upper surface of the protective surface 108 is substantially co-planar with the exterior surface of the electronic device. The protective substrate 108 can be comprised of a material that is substantially transparent, such as glass, plastic, etc.

The substrate 104 can be comprised of any material able to suitably dissipate heat generated by the illuminants 102. A non-metal substrate, such as one comprised of woven fiberglass cloth with an epoxy resin binder (e.g., FR4), may be used rather than a metal substrate. For example, a substrate 104 composed of FR4 may more efficiently dissipate the heat generated by multiple color channels without experiencing the retention issues typically encountered by metal substrates. Note, however, that some non-metal substrates cannot be used in combination with high-power illuminants that are commonly used for photography and videography, so the substrate 104 may be comprised of metal, ceramic, etc.

The processing components necessary for operating the illuminants 102 may be physically decoupled from the light source 100. For example, the processing components may be connected to the illuminants 102 via conductive wires running through the substrate 104. Examples of processing components include drivers 110, controllers 112, power sources 114 (e.g., batteries), etc. Consequently, the processing components need not be located within the light source 100. Instead, the processing components may be located elsewhere within the electronic device in which the light source 100 is installed.

Figure 1C:
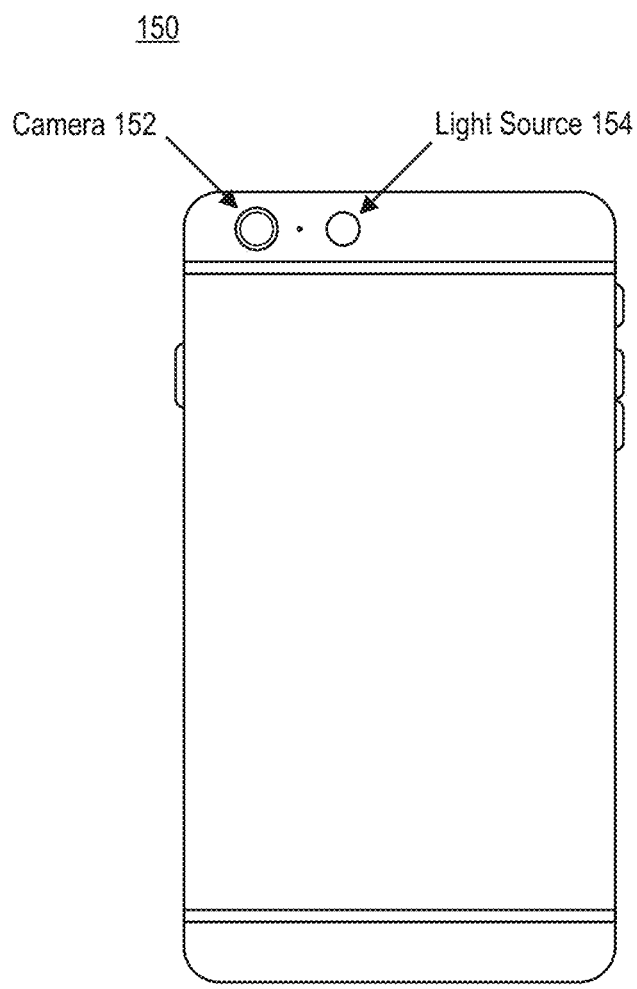
FIG. 1C depicts an electronic device that includes a rear-facing camera and a multi-channel light source configured to illuminate the ambient environment.

As further discussed below, the multi-channel light source 100 is designed to operate in conjunction with an image sensor. Accordingly, the multi-channel light source 100 could be configured to emit light responsive to determining that an image sensor has received an instruction to capture an image of a scene. The instruction may be created responsive to receiving input indicative of a request that the image be captured. As shown in FIG. 1C, an image sensor (here, a camera 152) may be housed within the same electronic device as a multi-channel light source. The request may be provided in the form of tactile input along the surface of a touch-sensitive display or a mechanical button accessible along the exterior of the electronic device.

In some embodiments, the multi-channel light source is designed such that it can be readily installed within the housing of an electronic device. FIG. 1C depicts an electronic device 150 that includes a rear-facing camera 152 and a multi-channel light source 154 configured to illuminate the ambient environment. The multi-channel light source 154 may be, for example, the multi-channel light source 100 of FIGS. 1A-B. The rear-facing camera 152 is one example of an image sensor that may be configured to capture images in conjunction with light produced by the light source 100. Here, the electronic device 150 is a mobile phone. However, those skilled in the art will recognize that the technology described herein could be readily adapted for other types of electronic devices, such as tablet computers and digital cameras.

The camera 152 is typically one of multiple image sensors included in the electronic device 150. For example, the electronic device 100 may include a front-facing camera that allows an individual to capture still images or video while looking at the display. The rear- and front-facing cameras can be, and often are, different types of image sensors that are intended for different uses. For example, the image sensors may be capable of capturing images having different resolutions. As another example, the image sensors could be paired with different light sources (e.g., the rear-facing camera may be associated with a stronger flash than the front-facing camera, or the rear-facing camera may be disposed in proximity to a multi-channel light source while the front-facing camera is disposed in proximity to a single-channel light source).

FIG. 2 depicts an example of an array 200 of illuminants 202. If the illuminants 202 are LEDs, the array 200 may be produced using standard dies (also referred to as "chips"). A die is a small block of semiconducting material on which the diode located. Typically, diodes corresponding to a given color are produced in large batches on a single wafer (e.g., comprised of electronic-grade silicon, gallium arsenide, etc.), and the wafer is then cut ("diced") into many pieces, each of which includes a single diode. Each of these pieces may be referred to as a "die."

As shown in FIG. 2, the array 200 includes multiple color channels configured to produce light of different colors. Here, for example, the array 200 includes five color channels—blue, cyan, lime, amber, and red. Each color channel can include one or more illuminants. Here, for example, three color channels (i.e., blue, lime, and red) include multiple illuminants, while two color channels (i.e., cyan and amber) include a single illuminant. The number of illuminants in each color channel, as well as the arrangement of these illuminants within the array 200, may vary based on the desired output characteristics, such as maximum CCT, minimum CCT, maximum temperature, etc.

The array 200 is generally capable of producing light greater than 1,000 lumens, though some embodiments are designed to produce light less than 1,000 lumens (e.g., 700-800 lumens during a flash event). In some embodiments, the illuminants 202 are positioned in the array 200 in a highly symmetrical pattern to improve spatial color uniformity. For example, when the array 200 is designed to produce white light through simultaneous driving of the multiple color channels, the illuminants corresponding to those color channels may be arranged symmetrically to facilitate mixing of the colored light.

The array 200 may be designed such that it can be installed within the housing of an electronic device (e.g., electronic device 150 of FIG. 10) in addition to, or instead of, a conventional flash component. For example, some arrays designed for installation within mobile phones are less than 4 mm in diameter, while other arrays designed for installation within mobile phones are less than 3 mm in diameter. The array 200 may also be less than 1 mm in height. In some embodiments, the total estimated area necessary for the array may be less than 3 $mm^2$ prior to installation and less than 6 $mm^2$ after installation. Such a design enables the array 200 to be positioned within a mobile phone without requiring significant repositioning of components within the mobile phone.

One advantage of a compact array of dies is that it can achieve good color mixing and adequate field of view (FOV) without the use of a collimator, diffuser, or lens. However, a collimator 204 (also referred to as a "mixing pipe") designed to ensure proper spatial color uniformity of light produced by the illuminants 202 could be placed around the array 200. At a high level, the collimator 204 may promote more uniform color mixing and better control of the FOV of light emitted by the illuminants 202. The collimator 204 can be comprised of an inflexible material (e.g., glass) or a flexible material (e.g., silicone). The collimator 204 may be in the form of a tubular body. In some embodiments the egress aperture of the tubular body is narrower than the array (e.g., the egress aperture may have a diameter of 2.5 mm, 3 mm, or 3.5 mm), while in other embodiments the egress aperture of the tubular body is wider than the array (e.g., the egress aperture may have a diameter of 4.5 mm, 5 mm, or 5.5 mm). Thus, the tubular body may have a sloped inner surface that either focuses or disperses light produced by the illuminants 202.

The array 200 may be used instead of, or in addition to, conventional flash technologies that are configured to generate a flash in conjunction with the capture of an image. Thus, an electronic device (e.g., electronic device 150 of FIG. 10) may include a single-channel light source and/or a multi-channel light source.

While embodiments may be described in terms of LEDs, those skilled in the art will recognize that other types of illuminants could be used instead of, or in addition to, LEDs. For example, embodiments of the technology may employ lasers, quantum dots ("QDs"), organic LEDs ("OLEDs"), resonant-cavity LEDs ("RCLEDs"), vertical-cavity surface-emitting lasers ("VCSELs"), superluminescent diodes ("SLDs" or "SLEDs"), blue "pump" LEDs under phosphor layers, up-conversion phosphors (e.g., microscopic ceramic particles that provide a response when excited by infrared radiation), nitride phosphors (e.g., CaAlSiN, SrSiN, KSiF), down-conversion phosphors (e.g., KSF:Mn4+, LiAlN), rubidium zinc phosphate, yttrium-aluminum-garnet (YAG) phosphors, lutetium-aluminum-garnet (LAG) phosphors, SiAlON phosphors, SiON phosphors, or any combination thereof. For example, the array 200 may include phosphor-converted colors such as a lime color that is created by a YAG phosphor coating on a blue LED. In such an embodiment, the highly efficient blue LED pumps the YAG phosphor coating with photons that are nearly entirely absorbed and then reemitted in the broader yellow-green band. This could also be done to create other colors such as red, amber, green, cyan, etc. As another example, multiple VCSELs and/or multiple QDs could be arranged in a given pattern on a substrate such that when the substrate is installed within the housing of an electronic device, the VCSELs and/or QDs emit electromagnetic radiation outward. The type of illuminants used to illuminate a scene may impact the schedule of illumination events. Said another way, some illuminants may need to be accommodated from a timing perspective. For example, phosphor-based illuminants generally exhibit delayed excitation and delayed de-excitation, so phosphor-based illuminants may be activated (e.g., strobed) in an early-on, early-off manner to avoid overlaps (i.e., where a first phosphor-based illuminant is still emitting some light when a second phosphor-based illuminant is activated).

Overview of Image Sensor

An image sensor is a sensor that detects information that constitutes an image. Generally, an image sensor accomplishes this by converting the variable attenuation of light waves (e.g., as they pass through or reflect off objects) into electrical signals, which represent small bursts of current that convey the information. Examples of image sensors include semiconductor-charge-coupled devices (CCDs) and complementary metal-oxide-semiconductor sensors (CMOS) sensors. Both types of image sensor accomplish the same task, namely, converting captured light into electrical signals. However, because CMOS sensors are generally cheaper, smaller, and less power-hungry than CCDs, many electronic devices use CMOS sensors for image capture.

Image sensors can also differ in their separation mechanism. One of the most common separation mechanisms is a filter array that passes light of different colors to selected pixel sensors. For example, each individual sensor element may be made sensitive to either red light, green light, or blue light by means of a color gel made of chemical dye. Because image sensors separate incoming light based on color, they may be said to have multiple sensor channels or multiple color channels. Thus, an image sensor that includes multiple sensor channels corresponding to different colors may be referred to as a "multi-channel image sensor."

Figure 3:
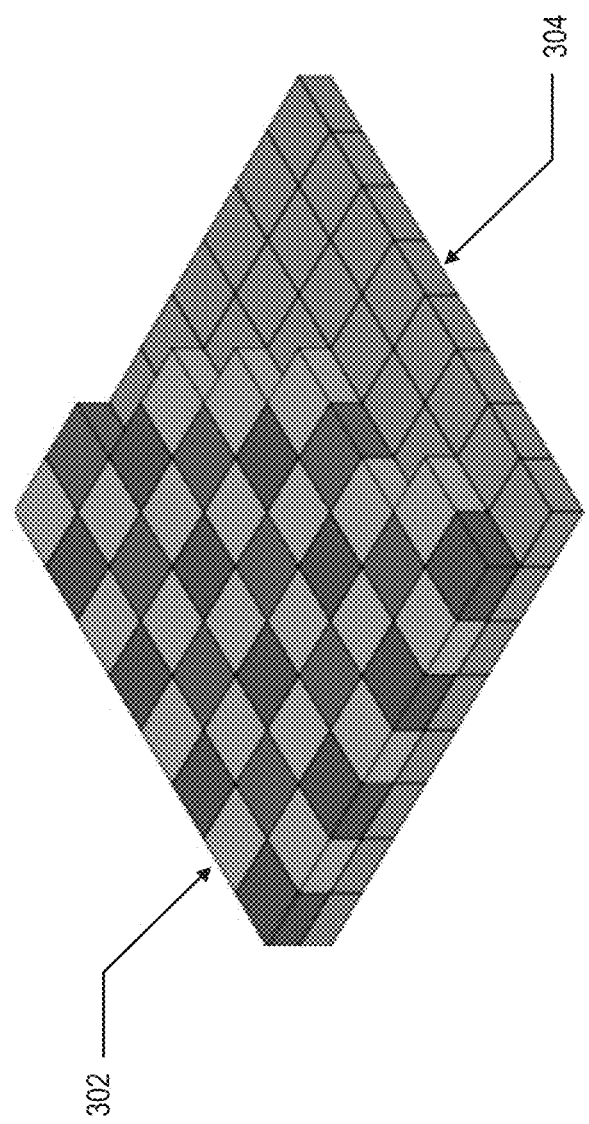
FIG. 3 depicts an example of a separation mechanism arranged over an image sensor.

FIG. 3 depicts an example of a separation mechanism 302 arranged over an image sensor 304. Here, the separation mechanism 302 is a Bayer filter array that includes three different types of color filters designed to separate incoming light into red light, green light, or blue light on a per-pixel basis. The image sensor 304, meanwhile, may be a CMOS sensor. Rather than use photochemical film to capture images, the electronic signal generated by the image sensor 304 is instead recorded to a memory for subsequent analysis.

After a recording function is initiated (e.g., responsive to receiving input indicative of a request to capture an image), a lens focuses light through the separation mechanism 602 onto the image sensor 604. As shown in FIG. 3, the image sensor 304 may be arranged in a grid pattern of separate imaging elements. Generally, the image sensor 304 determines the intensity of incoming light rather than the color of the incoming light. Instead, color is usually determined through the use of the separation mechanism 302 that only allows a single color of light into each imaging element. For example, a Bayer filter array includes three different types of color filter that can be used to separate incoming light into three different colors (i.e., red, green, and blue), and then average these different colors within a two-by-two arrangement of imaging elements. Each in a given image may be associated with such an arrangement of imaging elements. Thus, each pixel could be assigned separate values for red light, green light, and blue light. Another method of color identification employs separate image sensors that are each dedicated to capturing part of the image (e.g., a single color), and the results can be combined to generate the full color image.

Overview of Characterization Module

Figure 4:
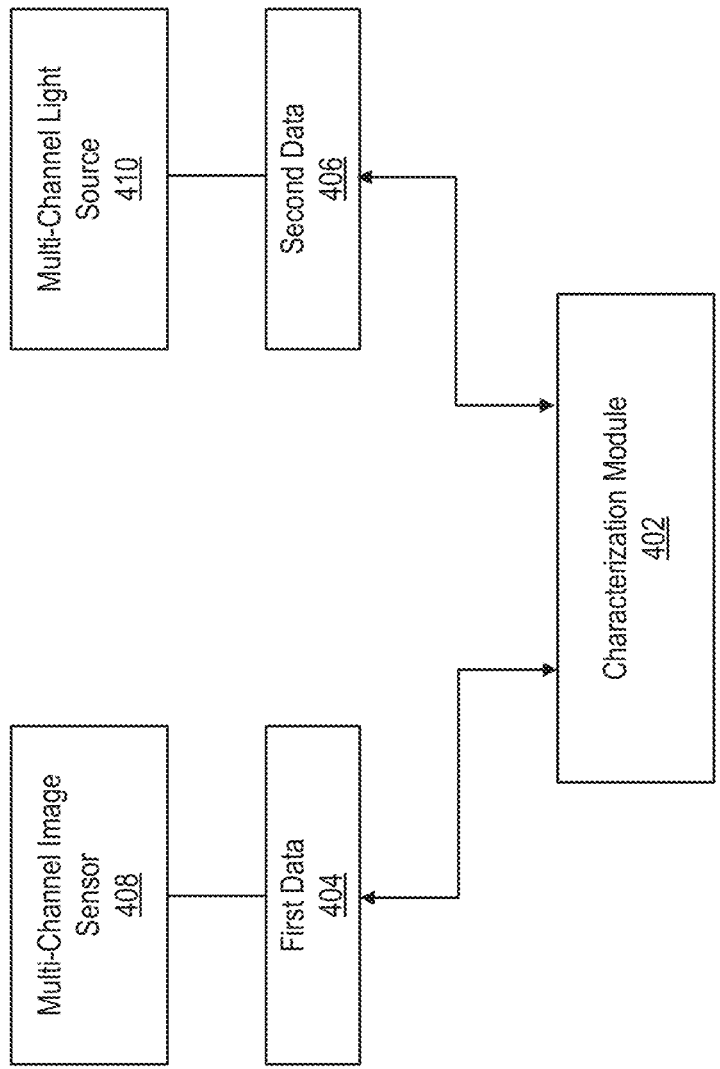
FIG. 4 depicts an example of a communication environment that includes a characterization module programmed to improve the fidelity of colors in images.

FIG. 4 depicts an example of a communication environment 400 that includes a characterization module 402 programmed to improve the fidelity of colors in images. The term "module" refers broadly to software components, firmware components, and/or hardware components. Accordingly, aspects of the processes described below could be implemented in software, firmware, and/or hardware. For example, these processes could be executed by a software program (e.g., a mobile application) executing on the electronic device (e.g., the mobile phone) that includes a multi-channel image sensor and a multi-channel light source, or these processes could be executed by an integrated circuit that is part of the multi-channel image sensor.

As shown in FIG. 4, the characterization module 402 may obtain data from different sources. Here, for example, the characterization module 402 obtains first data 404 generated by a multi-channel image sensor 408 (e.g., camera 152 of FIG. 1C) and second data 406 generated by a multi-channel light source 410 (e.g., light source 154 of FIG. 1C). The first data 404 can specify, on a per-pixel basis, an appropriate value for each sensor channel. For example, if the multi-channel image sensor 408 includes three sensor channels (e.g., red, green, and blue), then each pixel will be associated with at least three distinct values (e.g., a red value, a green value, and a blue value). The second data 406 can specify characteristics of each channel of the multi-channel light source 410. For example, the second data 406 may specify the driving current for each color channel during an illumination event (also referred to as a "lighting event"), the dominant wavelength of each color channel, the illuminance profile of each color channel, etc.

In some embodiments, the multi-channel image sensor 408 and the multi-channel light source 410 are housed within the same electronic device. In other embodiments, the multi-channel image sensor 408 and the multi-channel light source 410 reside within separate housings. For example, in the context of professional photography or videography, multiple multi-channel image sensors and multiple multi-channel light sources may be positioned in various arrangements to capture/illuminate different parts of a scene.

Figure 5:
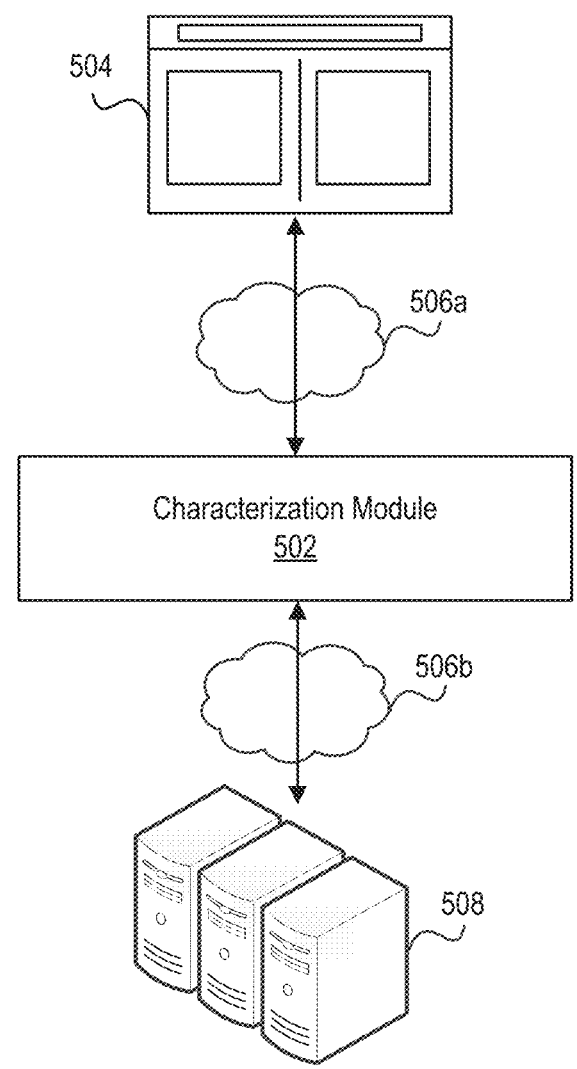
FIG. 5 illustrates a network environment that includes a characterization module.

FIG. 5 illustrates a network environment 500 that includes a characterization module 502. Individuals can interface with the characterization module 502 via an interface 504. As further discussed below, the characterization module 502 may be responsible for improving the fidelity of colors in images generated by a multi-channel image sensor. The characterization module 502 may also be responsible for creating and/or supporting the interfaces through which an individual can view the improved images, initiate post-processing operations, manage preferences, etc.

The characterization module 502 may reside in a network environment 500 as shown in FIG. 5. Thus, the characterization module 502 may be connected to one or more networks 506a-b. The networks 506a-b can include personal area networks (PANs), local area networks (LANs), wide area networks (WANs), metropolitan area networks (MANs), cellular networks, the Internet, etc. Additionally or alternatively, the characterization module 502 can be communicatively coupled to electronic device(s) over a short-range communication protocol, such as Bluetooth® or Near Field Communication (NFC).

In some embodiments, the characterization module 502 resides on the same electronic device as the multi-channel image sensor and the multi-channel light source. For example, the characterization module 502 may be part of a mobile application through which a multi-channel image sensor of a mobile phone can be operated. In other embodiments, the characterization module 502 is communicatively coupled to the multi-channel image sensor and/or the multi-channel light source across a network. For example, the characterization module 502 may be executed by a network-accessible platform (also referred to as a "cloud platform") residing on a computer server.

The interface 504 is preferably accessible via a web browser, desktop application, mobile application, or over-the-top (OTT) application. Accordingly, the interface 504 may be viewed on a mobile phone, tablet computer, personal computer, game console, music player, wearable electronic device (e.g., a watch or fitness accessory), network-connected ("smart") electronic device, (e.g., a television or home assistant device), virtual/augmented reality system (e.g., a head-mounted display), or some other electronic device.

Some embodiments of the characterization module 502 are hosted locally. That is, the characterization module 502 may reside on the same electronic device as the multi-channel image sensor or the multi-channel light source. For example, the characterization module 502 may be part of a mobile application through which a multi-channel image sensor of a mobile phone can be operated.

Other embodiments of the characterization module 502 are executed by a cloud computing service operated by Amazon Web Services® (AWS), Google Cloud Platform™, Microsoft Azure®, or a similar technology. In such embodiments, the characterization module 502 may reside on a host computer server that is communicatively coupled to one or more content computer servers 508. The content computer server(s) 508 can include color mixing models, items necessary for post-processing such as heuristics and algorithms, and other assets.

While embodiments may be described in the context of network-connected electronic devices, the characterization module 502 need not necessarily be continuously accessible via a network. For example, an electronic device may be configured to execute a self-contained computer program that only accesses a network-accessible platform while completing a pre-deployment configuration procedure. In such embodiments, the self-contained computer program may download information from, or upload information to, the network-accessible platform at a single point in time. Following deployment of the electronic device (e.g., after the electronic device has been packaged for sale), the self-contained computer program may not communicate with the network-accessible platform.

White Balance with Reference Illuminant Spectrums

Modern digital cameras have been designed to automatically perform white balancing when images are generated. For instance, an electronic device may have an AWB setting that, when selected, causes the scene to be assessed by algorithms designed to identify the brightest part as the white point and then attempt to balance the color of digital images based on that reference. Such an approach tends to be fairly effective in producing high-fidelity colors when a known reflectance spectrum is included in the scene that can be used as a reference. For example, professional photographers/videographers will normally add gray cards or color checkers to scenes that can serve as a reference for the AWB algorithms.

When a scene does not include a known reflectance spectrum, the AWB algorithms can (and often do) produce digital images that are visibly incorrect in terms of color. For example, if the scene is predominantly red, the AWB algorithms may mistake this for a color cast induced by a warm illuminant and then try to compensate by making the average color closer to neutral. But this will create a bluish color cast that may be quite noticeable.

Since adding a known reflectance spectrum is simply not practical in many scenarios, a better approach to producing images with high-fidelity color is necessary. Introduced here are computer programs and associated computer-implemented techniques for achieving high-fidelity color reproduction in the absence of any known reflectance spectrums. That is, high-fidelity color reproduction can be achieved without portable references, such as gray cards and color checkers. To accomplish this, a new reference spectrum— the "reference illuminant spectrum"—is introduced into scenes to be imaged by image sensors. The reference illuminant spectrum is created by a multi-channel light source whose spectral properties are known.

Figure 6:
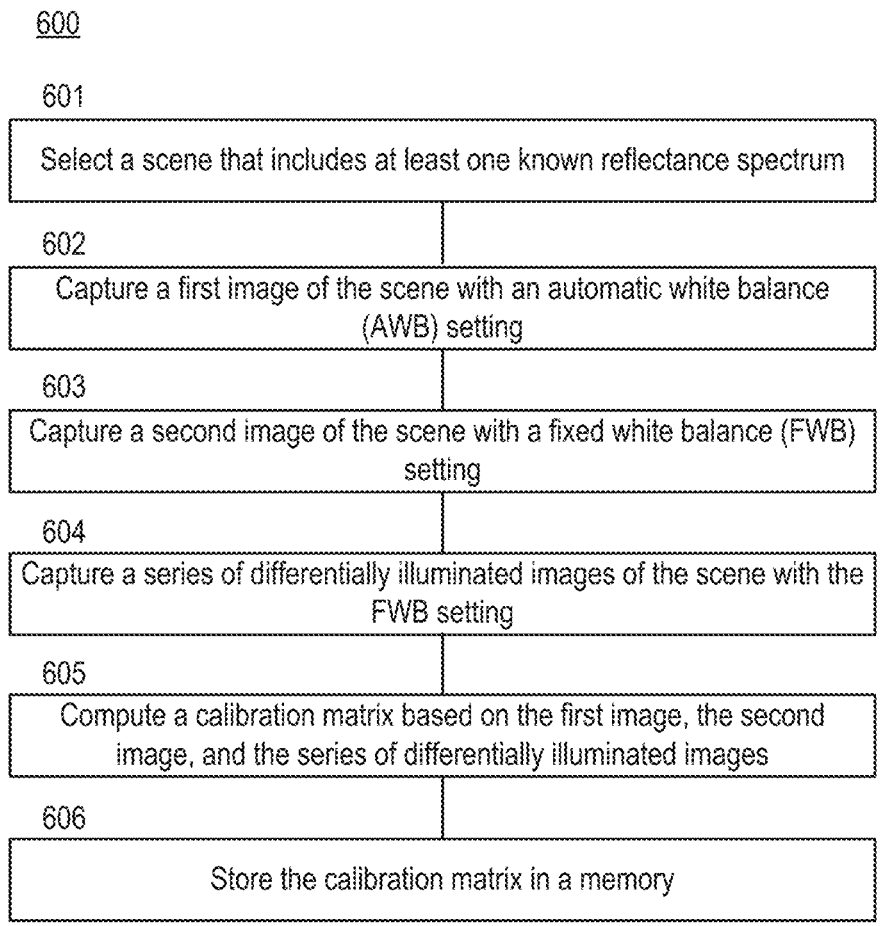
FIG. 6 depicts a flow diagram of a process for calibrating an electronic device that includes a multi-channel image sensor and a multi-channel light source prior to deployment.

FIG. 6 depicts a flow diagram of a process 600 for calibrating an electronic device that includes a multi-channel image sensor and a multi-channel light source prior to deployment. The process 600 may be initiated by the manufacturer of the electronic device before packaging it for sale.

Initially, the manufacturer selects a scene that includes at least one known reflectance spectrum (step 601). Normally, the manufacturer accomplishes this by choosing and/or creating a scene that includes one or more portable references. One example of a portable reference is a flat surface of a neutral gray color that derives from a flat reflectance spectrum—referred to as a "gray card." Another example of a portable reference is a flat surface with a series of different colors corresponding to different reflectance spectrums— referred to as a "color checker." Generally, the manufacturer selects the scene such that a variety of different reflectance spectra are included. These different reflectance spectra could be provided by a single portable reference (e.g., a color checker) or multiple portable references (e.g., a color checker and gray card).

Then, a set of images of the scene are captured in rapid succession. For example, the electronic device may capture a first image of the scene over a first exposure interval with an automatic white balance (AWB) setting (step 602) and a second image of the scene over a second exposure interval with a fixed white balance (FWB) setting (step 603). Neither the first image nor the second image is taken in conjunction with an illumination event performed by the multi-channel light source. Said another way, the first and second images are captured in conjunction with the same ambient light but different white balance settings. Normally, the AWB setting is applied by the electronic device by default to automatically correct color casts. The FWB setting, meanwhile, may be either a custom white balance or one of the preset white balances offered by the electronic device that correspond to different color temperatures. Examples of preset white balances include tungsten, fluorescent, daylight, flash, cloudy, and shade. Generally, the first exposure interval is different than the second exposure interval. For example, the second exposure interval may be 10, 20, 30, or 50 percent of the first exposure interval.

The electronic device may also capture a series of differentially illuminated images of the scene with the FWB setting (step 604). That is, the electronic device may capture a series of images in conjunction with a series of different illuminant spectrums. As further discussed below with respect to FIG. 9, the series of different illuminant spectrums can be produced by addressing each color channel of a multi-channel light source such that a series of flashes are produced in which all color channels are illuminated with a single color channel at a higher intensity. Thus, the number of differentially illuminated images may correspond to the number of color channels that the multi-channel light source has.

Thereafter, a characterization module can compute a calibration matrix based on analysis of the set of images, namely, the first image, the second image, and the series of differentially illuminated images (step 605). As further discussed below with respect to FIG. 7, each entry in the calibration matrix may include a vector of coefficients calculated from the corresponding pixel in the set of images. The characterization module can then store the calibration matrix in a memory accessible to the electronic device (step 606). Normally, the calibration matrix is stored in the local memory of the electronic device for quicker callback during future imaging operations. However, the calibration matrix could be stored in a remote memory accessible to the electronic device via a network instead of, or in addition to, the local memory.

FIG. 7 depicts a flow diagram of a process 700 for computing a calibration matrix based on a first image captured with an AWB setting, a second image captured with an FWB setting, and a series of differentially illuminated images captured with the FWB setting. At a high level, a characterization module can generate, for each pixel, an ambient-subtracted chromaticity fingerprint (or simply "chromaticity fingerprint") that can be used to populate the corresponding entry in the calibration matrix.

Initially, a characterization module can create a series of altered images by subtracting the red, green, and blue values of each pixel in the second image from the red, green, and blue values of the corresponding pixels in each of the series of differentially illuminated images (step 701). This will result in altered images in which each pixel has had the red, green, and blue channels reduced by the amount in the non-illuminated second image.

Then, the characterization module converts the series of altered images into the CIELAB color space so that each pixel is represented by a series of a* values and a series of b* values (step 702). In the CIELAB color space (also referred to as the "CIE L*a*b* color space" or "Lab color space"), color is expressed as three values: L* for the lightness from black (0) to white (11), a* from green (−) to red (+), and b* from blue (−) to yellow (+). The chromaticity fingerprint is comprised of these a* and b* values. Assume, for example, that the multi-channel light source includes five color channels. In such a scenario, the series of altered images will include five images, and the chromaticity fingerprint (F) for each pixel can be represented in vector form as follows:

$$F=[a^*_1 b^*_1 a^*_2 b^*_2 a^*_3 b^*_3 a^*_4 b^*_4 a^*_5 b^*_5],$$

where each value pairing $(a^*_i, b^*_i)$ is associated with the corresponding pixel in one of the altered images. Similarly, the characterization module can convert the first image into the CIELAB color space so that each pixel is represented as a reference a* value and a reference b* value (step 703). The reference a* and b* values, which represent the ground truth answer, can be represented in vector form as follows:

$$[a^*_r, b^*_r].$$

For each pixel, the characterization module can form a system of linear equations for a* and b* with a vector of coefficients (C) as follows:

$$C \cdot [a^*_1 b^*_1 a^*_2 b^*_2 a^*_3 b^*_3 a^*_4 b^*_4 a^*_5 a^*_5]_{xy} = a^*_{r,xy}$$

$$C \cdot [a^*_1 b^*_1 a^*_2 b^*_2 a^*_3 b^*_3 a^*_4 b^*_4 a^*_5 b^*_5]_{xy} = b^*_{r,xy}$$

where $C=[c_1\ c_2\ c_3\ c_4\ c_5]$ and xy is the coordinates of the pixel. Thus, the color value of a given pixel in the first image is defined as the dot product between the vector of coefficients and the chromaticity fingerprint of that pixel as determined from the series of altered images. At a high level, each system of linear equations represents (i) a first linear equation based on the reference a* value for a given pixel and the series of a* values for the given pixel (step 704) and (ii) a second linear equation based on the reference b* value for the given pixel and the series of b* values for the given pixel (step 705).

Thereafter, the characterization module can perform, for each pixel, a least squares optimization on the system of linear equations to produce the vector of coefficients (step 706). Said another way, the characterization module can perform a least squares optimization to establish the coefficients. Then, the characterization module can populate a data structure representative of the calibration matrix with the vectors of coefficients (step 707). Each entry in the calibration matrix may include the vector of coefficients established for the corresponding pixel.

Figure 8:
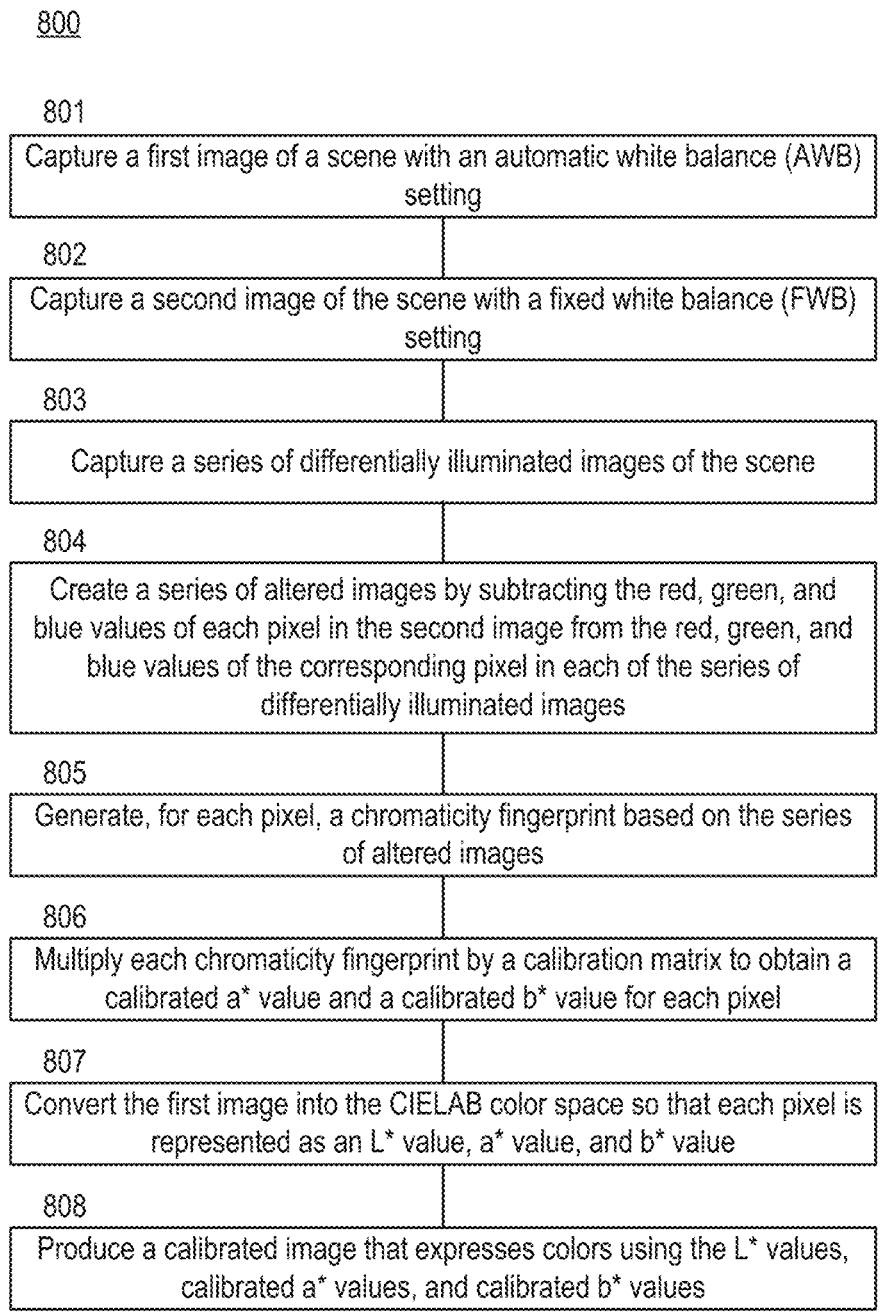
FIG. 8 depicts a flow diagram of a process for employing a calibration matrix produced for an electronic device during a pre-deployment calibration process (e.g., by completing process of FIG. 6).
Figure 10:
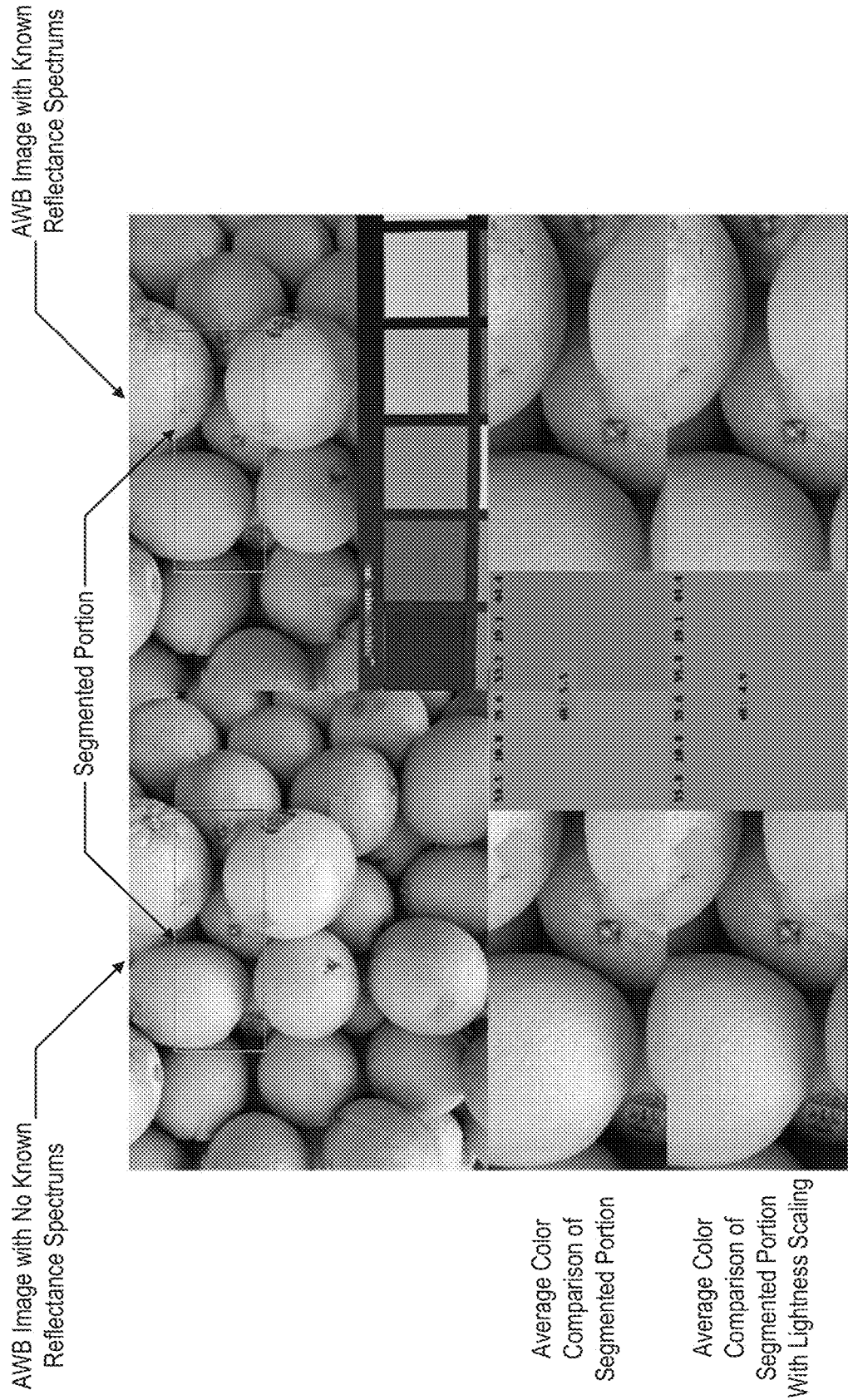
FIGS. 10-16 illustrate why the reference illuminant white balance (RIWB) approach described herein for reproducing colors with high fidelity is necessary.
Figure 11:
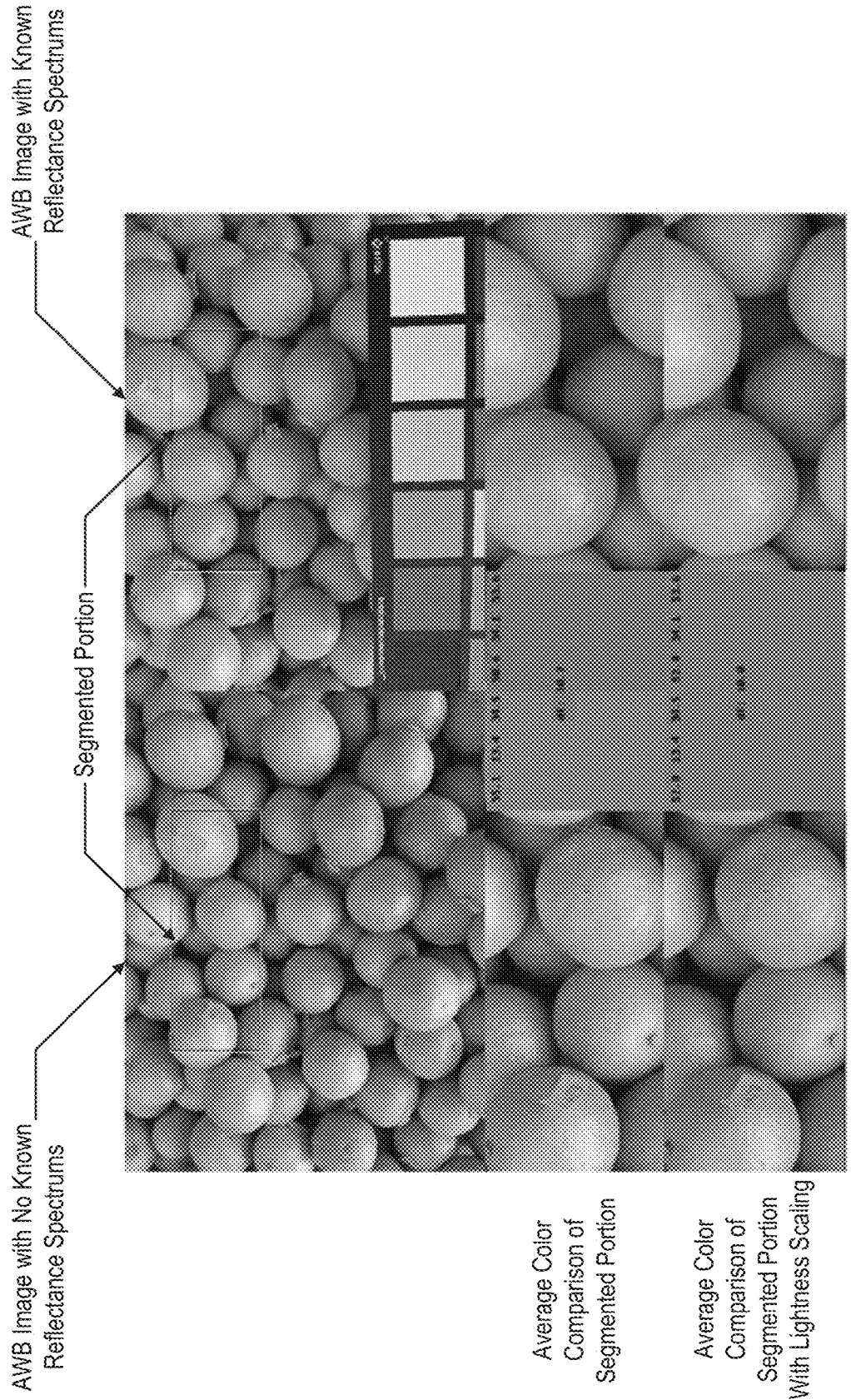
Figure 12:
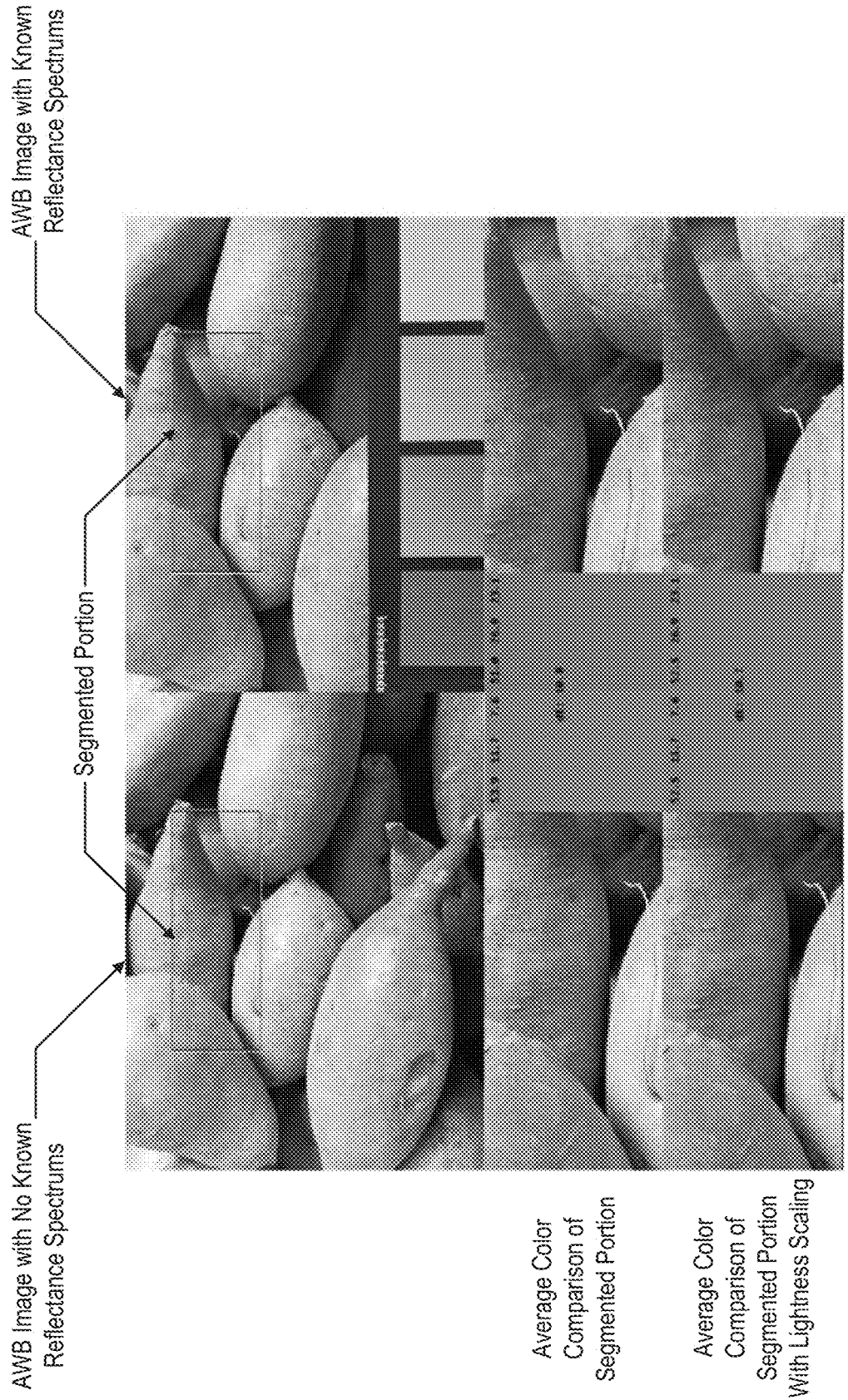
Figure 13:
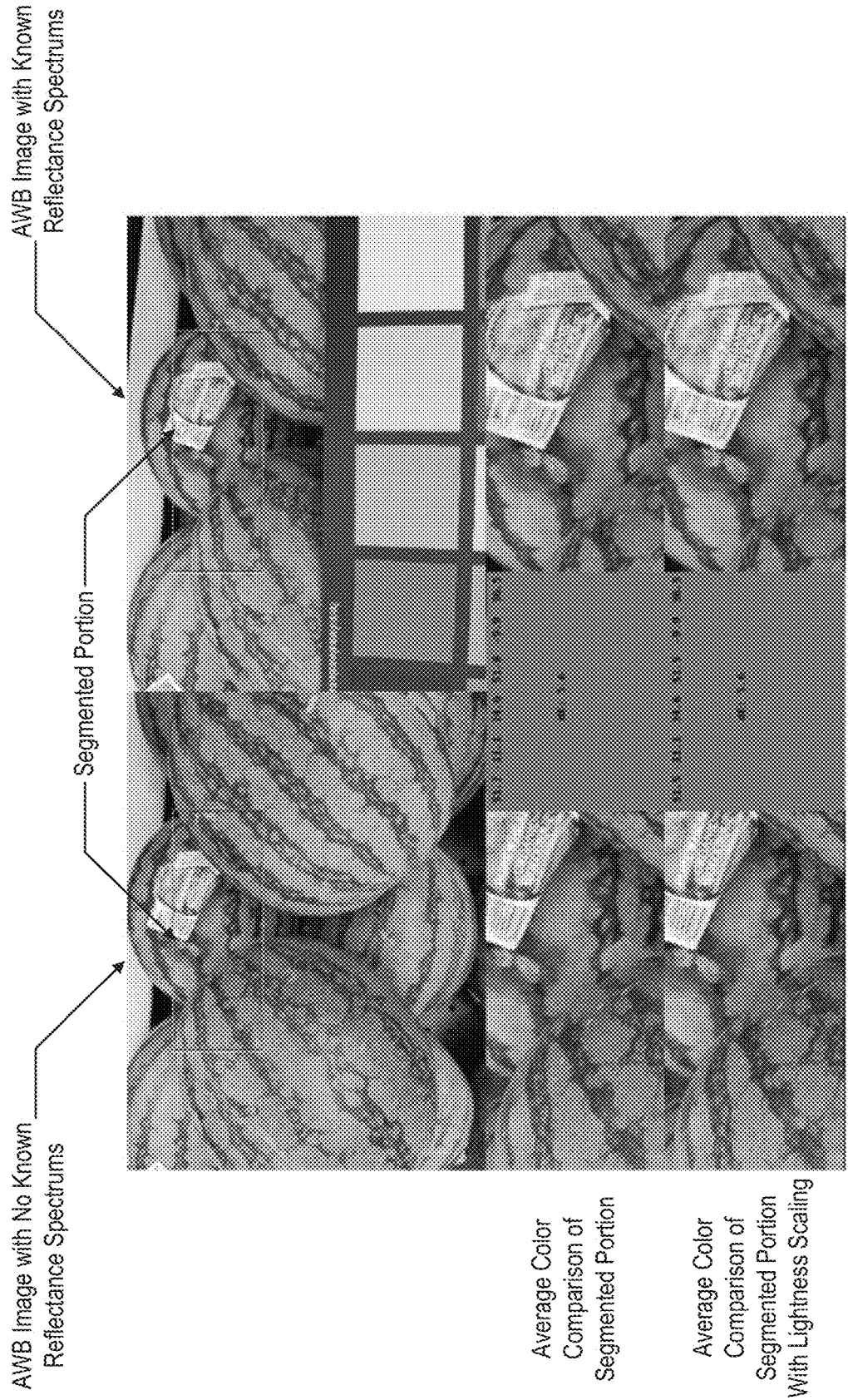
Figure 14:
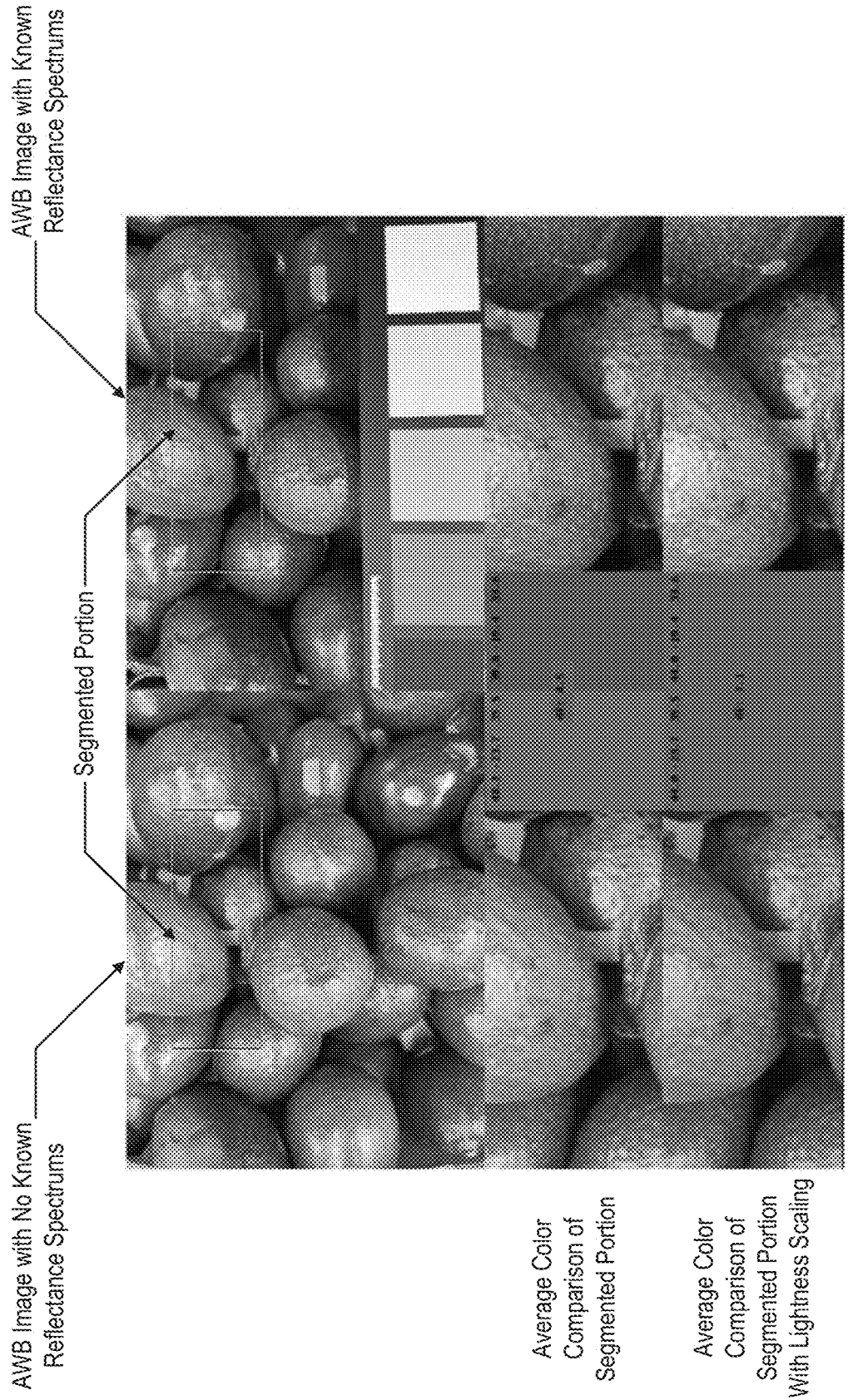
Figure 15:
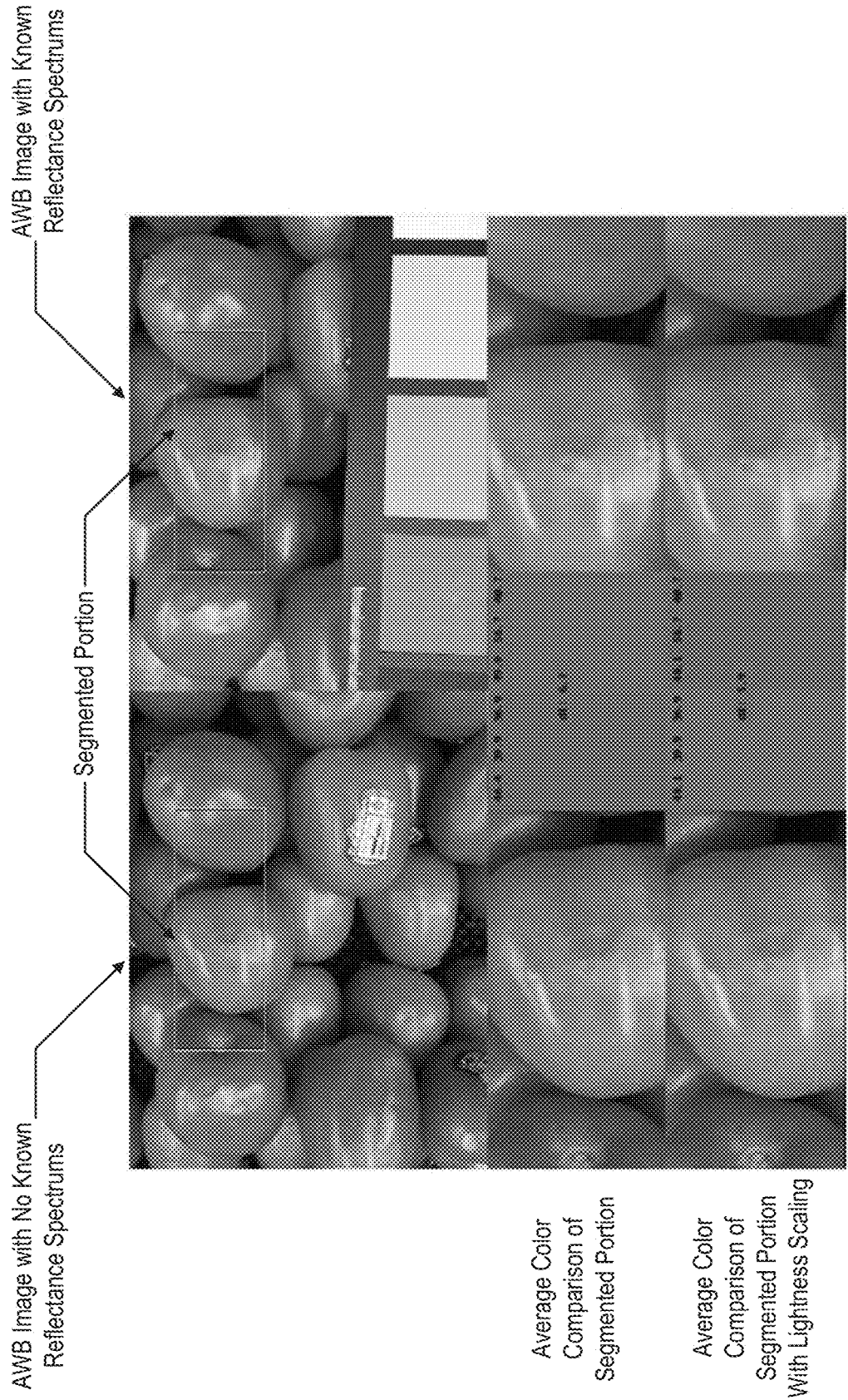
Figure 16:
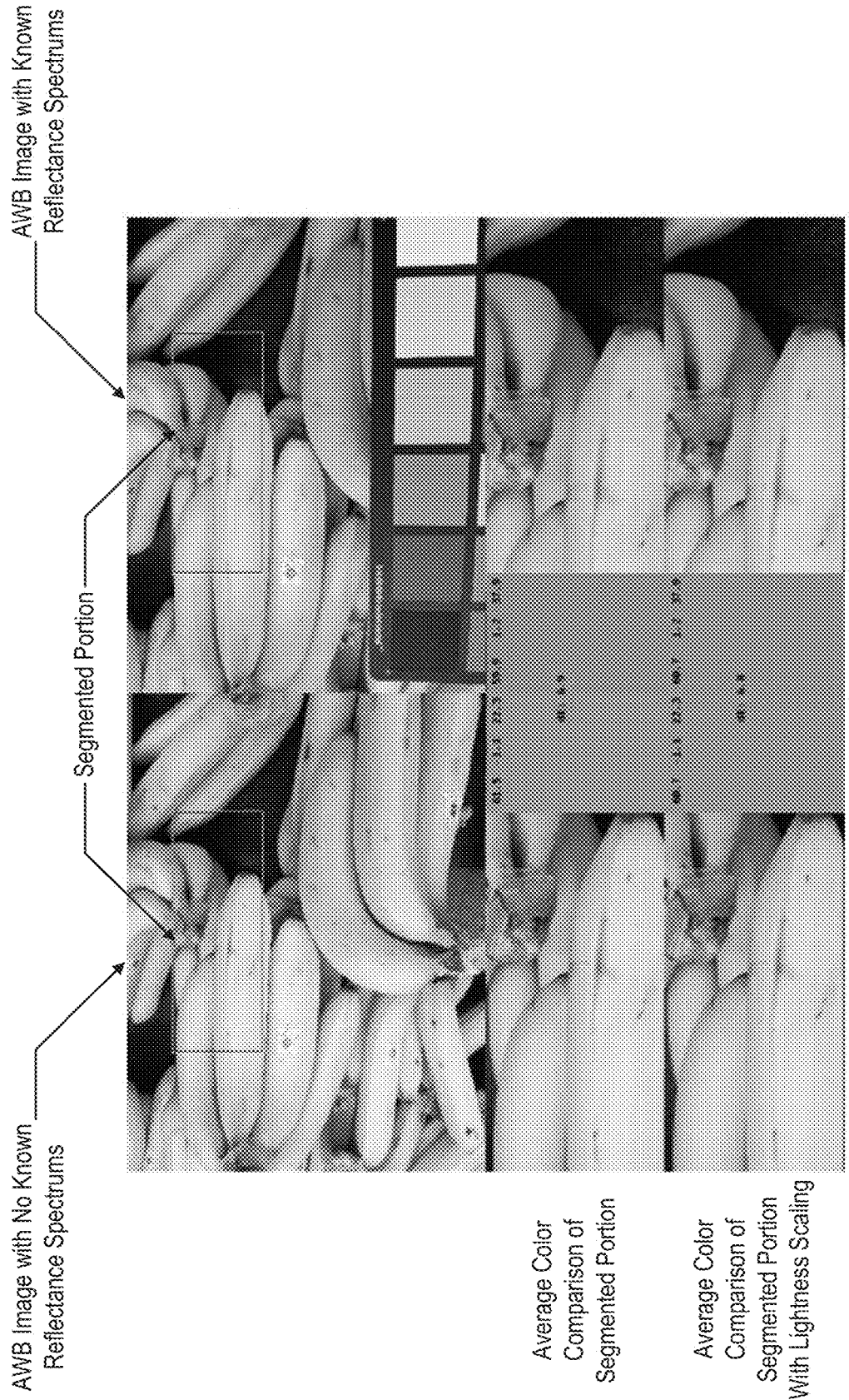

FIG. 8 depicts a flow diagram of a process 800 for employing a calibration matrix produced for an electronic device during a pre-deployment calibration process (e.g., by completing process 600 of FIG. 6). By employing the calibration matrix, the electronic device can achieve high-fidelity color reproduction without portable references needing to be in the scene.

Initially, a set of images of a scene are captured in rapid succession. For example, the electronic device may capture a first image of the scene over a first exposure interval with an AWB setting (step 801) and a second image of the scene over a second exposure interval with an FWB setting (step 802). Neither the first image nor the second image is taken in conjunction with an illumination event performed by the multi-channel light source. Generally, the first exposure interval is different than the second exposure interval. For example, the second exposure interval may be 10, 20, 30, or 50 percent of the first exposure interval. The electronic device may also capture a series of differentially illuminated images of the scene with the FWB setting (step 803). That is, the electronic device may capture a series of images in conjunction with a series of different illuminant spectrums. As further discussed below with respect to FIG. 9, the series of different illuminant spectrums can be produced by addressing each color channel of a multi-channel light source such that a series of flashes are produced in which all color channels are illuminated with a single color channel at a higher intensity. Thus, the number of differentially illuminated images may correspond to the number of color channels that the multi-channel light source has.

A characterization module can then create a series of altered images by subtracting the red, green, and blue values of each pixel in the second image from the red, green, and blue values of the corresponding pixels in each of the series of differentially illuminated images (step 804). This will result in altered images in which each pixel has had the red, green, and blue channels reduced by the amount in the non-illuminated second image. Then, the characterization module can generate, for each pixel, a chromaticity fingerprint based on the series of altered images (step 805). Step 805 of FIG. 8 is substantially similar to step 702 of FIG. 7. These chromaticity fingerprints can be multiplied by a calibration matrix to obtain a calibrated a* value and a calibrated b* value for each pixel (step 806). More specifically, each chromaticity fingerprint can be multiplied by the corresponding entry in the calibration matrix to obtain the calibrated a* and b* values. Generally, the calibration matrix is stored in a local memory of the electronic device. However, the calibration matrix could be retrieved from a remote memory to which the electronic device is connected across a network.

Thereafter, the characterization module can convert the first image into the CIELAB color space so that each pixel is represented as an L* value, a* value, and b* value (step 807). Rather than use these a* and b* values, however, the characterization module can produce a calibrated image by replacing them with the calibrated a* and b* values obtained in step 806. This calibrated image may express colors using the L* values from the first image and the calibrated a* and b* values derived from the series of altered images.

Unless contrary to physical possibility, it is envisioned that the steps described above may be performed in various sequences and combinations. For example, multiple instances of the process 600 of FIG. 6 could be executed on multiple sets of images. Other steps may also be included in some embodiments. For example, the electronic device may cause display of the calibrated image on an interface for review. The electronic device could display the calibrated image near the first image so that an individual is able to review the differences, or the electronic device could enable the individual to alternate between the calibrated image and the first image.

FIG. 9 illustrates how a multi-channel light source (or simply "light source") may perform a series of illumination events to differentially illuminate a scene. Differential illumination may be key to the calibration process described with respect to FIG. 6 and the optimization process described with respect to FIG. 8.

Assume, for example, that the light source includes five different color channels yielding five different illuminant spectra. Each color channel may be separately driven with current. More specifically, each color channel may be addressable at a number of intermediate states between an off state (e.g., where the output level is 0) and a full intensity state (e.g., where the output level is 255). As an example, the full intensity state may correspond to an output current of roughly one amp while every intermediate state may correspond to some fraction of an amp.

To generate different illuminant spectra, the driving currents of the different color channels can be varied. FIG. 9 includes examples of five different combinations of channel spectra that are shown along with the corresponding composite illuminant spectrum. Here, each composite illuminant spectrum is produced by driving four color channels at an output level of 100 and one color channel at an output level of 150. However, those skilled in the art will recognize that these numbers have been provided solely for the purpose of illustration. Generally, the output levels themselves are not important as long as one output level is higher than the others, though it may be desirable to drive all color channels with enough current to produce a white light. As can be seen in FIG. 9, each composite illuminant spectrum has a different spectral power distribution (SPD).

Evidence of Need for High-Fidelity Color Reproduction

FIGS. 10-16 illustrate why the reference illuminant white balance (RIWB) approach described herein for reproducing colors with high fidelity is necessary. In each drawing, the first image in the upper-left corner was taken of a scene having no known reflectance spectrums with an AWB setting, while the second image in the upper-right corner was taken of the same scene having known reflectance spectrums (here, provided by a color checker) with the AWB setting. At a high level, the second image can be thought of as the "ground truth" for what the first image should actually look like.

Beneath these images, there are two rows. The first row includes a comparison of the average color of pixels within a segmented portion of each image, and the second row visually includes a comparison of the average color of those pixels following a lightness scaling operation. These average color values provide an indication of how closely pixels in the first image corresponds to the second image. Note that these average color values can be quite far apart. In fact, these average color values are readily distinguishable from one another in most cases as indicated by the delta E (dE) values which correspond to color error. Many of these delta E values exceed 5.0, which means the visual difference between the first and second images should be (and is) quite noticeable. By employing the RIWB approach described herein, delta E values of less than 1.0 can be achieved. In most instances, a pair of colors whose delta E value is less than 1.0 will be visually indistinguishable from one another.

The second row is largely identical to the first row except that that the segmented portions are adjusted to have the same lightness. That is, the pixels in the segmented portions are scaled to have the same L* value in the CIELAB color space. This is done because, when making the known reflectance spectrum versus no known reflectance spectrum comparison, it may be that the introduction of the color checker affected the exposure, thereby causing the second image to be either lighter or darker. As can be seen in the second row, the color is still significantly off despite having made the brightness level equal between the segmented portions of the first and second images (i.e., by brightening the darker of these images and/or darkening the brighter of these images).

Computing System

Figure 17:
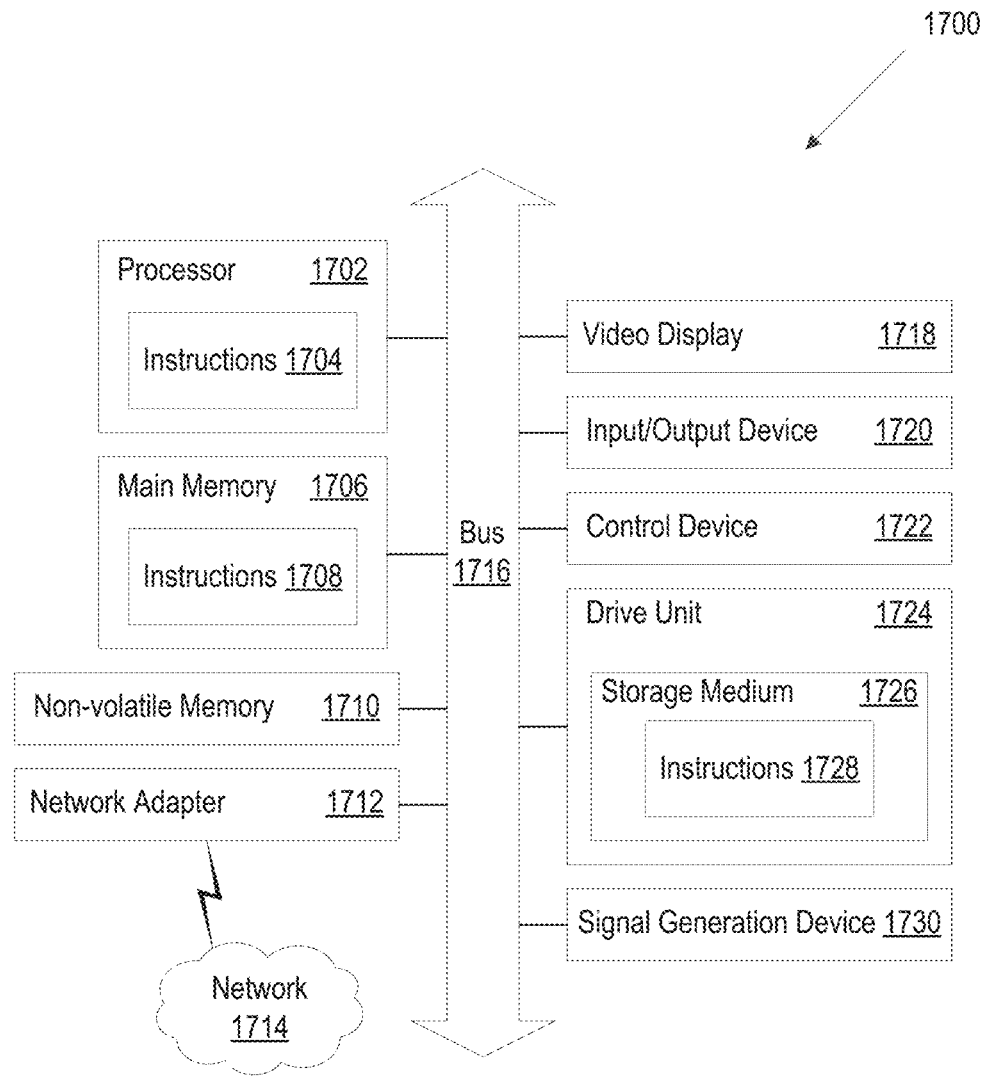
FIG. 17 is a block diagram illustrating an example of a computing system in which at least some operations described herein can be implemented.

FIG. 17 is a block diagram illustrating an example of a computing system 1700 in which at least some operations described herein can be implemented. For example, some components of the computing system 1700 may be part of an electronic device (e.g., electronic device 150 of FIG. 1) that includes a multi-channel light source and/or a multi-channel image sensor.

The computing system 1700 may include one or more central processing units (also referred to as "processors") 1702, main memory 1706, non-volatile memory 1710, network adapter 1712 (e.g., network interface), video display 1718, input/output devices 1720, control device 1722 (e.g., keyboard and pointing devices), drive unit 1724 including a storage medium 1726, and signal generation device 1730 that are communicatively connected to a bus 1716. The bus 1716 is illustrated as an abstraction that represents one or more physical buses and/or point-to-point connections that are connected by appropriate bridges, adapters, or controllers. The bus 1716, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The computing system 1700 may share a similar computer processor architecture as that of a personal computer, tablet computer, mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computing system 1700.

While the main memory 1706, non-volatile memory 1710, and storage medium 1726 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 1728. The term "machine-readable medium" and "storage medium" shall also be taken to include any medium that is capable of storing, encoding, or carrying a set of instructions for execution by the computing system 1700.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 1704, 1708, 1728) set at various times in various memory and storage devices in a computing device. When read and executed by the one or more processors 1702, the instruction(s) cause the computing system 1700 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 1710, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 1712 enables the computing system 1700 to mediate data in a network 1714 with an entity that is external to the computing system 1700 through any communication protocol supported by the computing system 1700 and the external entity. The network adapter 1712 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 1712 may include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

REMARKS

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method for calibrating an electronic device with an image sensor, the method comprising:
    capturing a first image of a scene having at least one known reflectance spectrum over a first exposure interval with an automatic white balance (AWB) setting;
    capturing a second image of the scene over a second exposure interval different than the first exposure interval with a fixed white balance (FWB) setting;
    capturing a series of differentially illuminated images of the scene with the FWB setting;
    computing a calibration matrix based on the first image, the second image, and the series of differentially illuminated images by
        creating a series of altered images by subtracting the red, green, and blue values of each pixel in the second image from the red, green, and blue values of the corresponding pixel in the series of differentially illuminated images,
        converting the series of altered images into a CIELAB color space so that each pixel is represented by a series of a* values and a series of b* values,
        converting the first image into the CIELAB color space so that each pixel is represented as a reference a* value and a reference b* value,
        forming, for each pixel, a system of linear equations that includes
            (i) a first linear equation based on the corresponding reference a* value and the corresponding series of a* values, and
            (ii) a second linear equation based on the corresponding reference b* value and the corresponding series of b* values,
        performing, for each pixel, a least squares optimization on the first and second linear equations to produce a vector of coefficients, and
        populating a data structure representative of the calibration matrix with the vectors of coefficients; and
    storing the calibration matrix in a memory accessible to the electronic device.

2. The method of claim 1, further comprising:
    addressing each color channel of a light source with at least three color channels in such a manner to perform a series of illumination events in which all color channels are illuminated with one color channel at a higher intensity, wherein the series of differentially illuminated images is captured in conjunction with the series of illumination events.

3. The method of claim 1, wherein the FWB setting is one of multiple preset white balances offered by the electronic device.

4. The method of claim 1, wherein the second exposure interval is no more than 20 percent of the first exposure interval.

5. The method of claim 1, further comprising:
    receiving input specifying the FWB setting with which the second image is to be captured.

6. The method of claim 1, wherein the at least one reference reflectance spectrum is provided by a gray card with a flat surface of a neutral gray color.

7. The method of claim 1, wherein the at least one reference reflectance spectrum is provided by a color checker with at least one color evaluating sample in Illuminating Engineering Society (IES) Technical Memorandum (TM) 30-15.

8. The method of claim 1, wherein each image in the series of differentially illuminated images corresponds to a different illuminant spectrum.

9. The method of claim 8, wherein each illuminant spectrum is representative of light in multiple colors with one color at a higher intensity than the other colors.

10. The method of claim 1, wherein the series of differentially illuminated images are captured in conjunction with a series of differential illumination events performed by a multi-channel light source, and wherein the multi-channel light source includes multiple channels corresponding to different wavelengths in the electromagnetic spectrum.

11. The method of claim 10, wherein each channel includes one or more illuminants configured to produce light of a substantially similar color.

12. The method of claim 1, further comprising:
- populating, for each pixel, a second vector that is representative of a chromaticity fingerprint with the corresponding series of a* values and the corresponding series of b* values.

\* \* \* \* \*